United States Patent [19]
Soda et al.

[11] Patent Number: 5,793,767
[45] Date of Patent: Aug. 11, 1998

[54] ATM COMMUNICATION DEVICE AND ATM COMMUNICATION NETWORK SYSTEM WITH TERMINAL DEVICES HAVING UNIQUELY ASSIGNED VIRTUAL CHANNEL IDENTIFIERS

[75] Inventors: Keiichi Soda; Tatsuki Ichihashi; Yukio Ushisako; Kazuyuki Kashima; Tetsuya Yokotani; Koichi Hiramatsu, all of Kanagawa; Makoto Shibahara, Hyogo, all of Japan

[73] Assignee: Mitsubishi Denki Kabushiki Kaisha, Tokyo, Japan

[21] Appl. No.: 597,825

[22] Filed: Feb. 7, 1996

[30] Foreign Application Priority Data

Feb. 27, 1995 [JP] Japan ................................ 7-038660

[51] Int. Cl.$^6$ ................................................. H04L 12/56
[52] U.S. Cl. ............................ 370/397; 370/409; 370/471
[58] Field of Search ........................................ 370/390, 395, 370/397, 409, 471

[56] References Cited

U.S. PATENT DOCUMENTS

| | | | |
|---|---|---|---|
| 4,998,246 | 3/1991 | Tanaka | 370/452 |
| 5,068,849 | 11/1991 | Tanaka | 370/509 |
| 5,357,508 | 10/1994 | Le Boudec et al. | 370/397 |
| 5,414,701 | 5/1995 | Shtayer et al. | 370/395 |
| 5,430,715 | 7/1995 | Corbalis et al. | 370/392 |
| 5,467,349 | 11/1995 | Huey et al. | 370/397 |
| 5,521,917 | 5/1996 | Watanabe et al. | 370/399 |
| 5,541,915 | 7/1996 | Storm | 370/390 |
| 5,548,589 | 8/1996 | Jeon et al. | 370/399 |
| 5,577,032 | 11/1996 | Sone et al. | 370/390 |

OTHER PUBLICATIONS

The ATM Forum Technical Committee User–Network Interface (UNI) Specification.
Tran Switch "Sara Chipset Technical Manual" TranSwitch Corporation, Shelton, CT 06484.

*Primary Examiner*—Hassan Kizou
*Attorney, Agent, or Firm*—Wolf, Greenfield & Sacks, P.C.

[57] ABSTRACT

An asynchronous transfer mode (ATM) communication network system is constructed by connecting a plurality of ATM terminal communication devices to each other through connections. Each ATM terminal communication device has a transmission function to transmit an output ATM cell and a receiving function to receive an input ATM cell. Each ATM terminal communication device includes memory including a connection control table having, for each ATM terminal communication device, an assigned virtual path identifier and an assigned virtual channel identifier; and an ATM cell transmission section for transmitting an output ATM cell including the virtual path identifier assigned to the ATM terminal communication device and the virtual channel identifier assigned to other ATM terminal communication devices, the virtual path identifier indicating the ATM terminal communication device as a transmitter of the output ATM cell, and the virtual channel identifier indicating the other ATM terminal communication device as a receiver of the output ATM cell. Each ATM terminal communication device further includes an ATM cell receiving section for comparing a virtual channel identifier of an input ATM cell with the virtual channel identifier assigned to the ATM terminal communication device, trapping the ATM cell when the virtual channel identifier of the input ATM cell matches the virtual channel identifier of the ATM terminal communication device, and discarding the input ATM cell when the virtual channel identifier of the input ATM cell does not match the virtual channel identifier of the ATM terminal communication device. The ATM terminal communication devices form a point to multipoint connection for a virtual path identified by the virtual path identifier of the output ATM cell transmitted from the ATM terminal communication device.

11 Claims, 21 Drawing Sheets

CONNECTION CONTROL TABLE IN TERMINAL DEVICE

16 — VIRTUAL PATH CONNECTION CONTROL TABLE

| TERMINAL DEVICE | VIRTUAL PATH IDENTIFIER |
|---|---|
| TERMINAL DEVICE 1a | VP1 |
| TERMINAL DEVICE 1b | VP2 |
| TERMINAL DEVICE 1c | VP3 |
| TERMINAL DEVICE 1d | VP4 |
| TERMINAL DEVICE 1e | VP5 |
| TERMINAL DEVICE 1f | VP6 |

15 — ADDRESS CONTROL TABLE IN TERMINAL DEVICE

| TERMINAL DEVICE | VIRTUAL CHANNEL IDENTIFIER |
|---|---|
| TERMINAL DEVICE 1a | VC1 |
| TERMINAL DEVICE 1b | VC2 |
| TERMINAL DEVICE 1c | VC3 |
| TERMINAL DEVICE 1d | VC4 |
| TERMINAL DEVICE 1e | VC5 |
| TERMINAL DEVICE 1f | VC6 |

F I G. 4

CONNECTION CONTROL TABLE IN SWITCHING DEVICE 4 (4a~4e)

| PORT NUMBER | INPUT | | | OUTPUT | | |
|---|---|---|---|---|---|---|
| | VPI VALUE | VCI VALUE | PORT NUMBER | VPI VALUE | VCI VALUE |
| PORT 0 | VP 1 | — | PORTS 1 TO 3 | VP 1 | — |
| .. | .. | .. | .. | .. | .. |

(FOLLOWING IS A CORRESPONDING CONNECTION)

...POINT TO MULTIPLE CONNECTION FROM TERMINAL 1a

FIG. 6

CONNECTION CONTROL TABLE IN TERMINAL DEVICE 3 (3a~3f)

VIRTUAL PATH CONNECTION CONTROL TABLE 16

| TERMINAL DEVICE | VIRTUAL PATH IDENTIFIER |
|---|---|
| TERMINAL DEVICE 1a | VP1 |
| TERMINAL DEVICE 1b | VP2 |
| TERMINAL DEVICE 1c | VP3 |
| TERMINAL DEVICE 1d | VP4 |
| TERMINAL DEVICE 1e | VP5 |
| TERMINAL DEVICE 1f | VP6 |

ADDRESS CONTROL TABLE IN TERMINAL DEVICE 17

| TERMINAL DEVICE | VIRTUAL CHANNEL IDENTIFIER |
|---|---|
| TERMINAL DEVICE 1a | VC1 |
| TERMINAL DEVICE 1b | VC2 |
| TERMINAL DEVICE 1c | VC3 |
| TERMINAL DEVICE 1d | VC4 |
| TERMINAL DEVICE 1e | VC5 |
| TERMINAL DEVICE 1f | VC6 |
| ALL OF TERMINAL DEVICES | VC0 |

F I G. 14
(PRIOR ART)

CONNECTION CONTROL TABLE IN SWITCHING DEVICE 4a

| PORT NUMBER | INPUT | | | OUTPUT | | | |
|---|---|---|---|---|---|---|---|
| | VPI VALUE | VCI VALUE | | PORT NUMBER | VPI VALUE | VCI VALUE | |
| PORT 0 | VP 10 | VC 10 | | PORT 1 | VP 11 | VC 11 | ···TERMINAL 1a→TERMINAL 1b CONNECTION |
| PORT 0 | VP 20 | VC 20 | | PORT 2 | VP 21 | VC 21 | ···TERMINAL 1a→TERMINAL 1c CONNECTION |
| PORT 0 | VP 30 | VC 30 | | PORT 2 | VP 31 | VC 31 | ···TERMINAL 1a→TERMINAL 1d CONNECTION |
| PORT 0 | VP 40 | VC 40 | | PORT 3 | VP 41 | VC 41 | ···TERMINAL 1a→TERMINAL 1e CONNECTION |
| PORT 0 | VP 50 | VC 50 | | PORT 3 | VP 51 | VC 51 | ···TERMINAL 1a→TERMINAL 1f CONNECTION |
| ·· | ·· | ·· | | ·· | ·· | ·· | (FOLLOWING IS A CORRESPONDING CONNECTION) |

FIG. 17
(PRIOR ART)

| CONNECTION CONTROL TABLE IN SWITCHING DEVICE 4a | | | | | |
|---|---|---|---|---|---|
| INPUT | | | OUTPUT | | |
| PORT NUMBER | VPI VALUE | VCI VALUE | PORT NUMBER | VPI VALUE | VCI VALUE |
| PORT 0 | VP 10 | VC 10 | PORTS 1 TO 3 | VP 11 | VC 11 |
| .. | .. | .. | .. | .. | .. |

(FOLLOWING IS A CORRESPONDING CONNECTION)

...POINT TO MULTIPLE CONNECTION FROM TERMINAL 1a

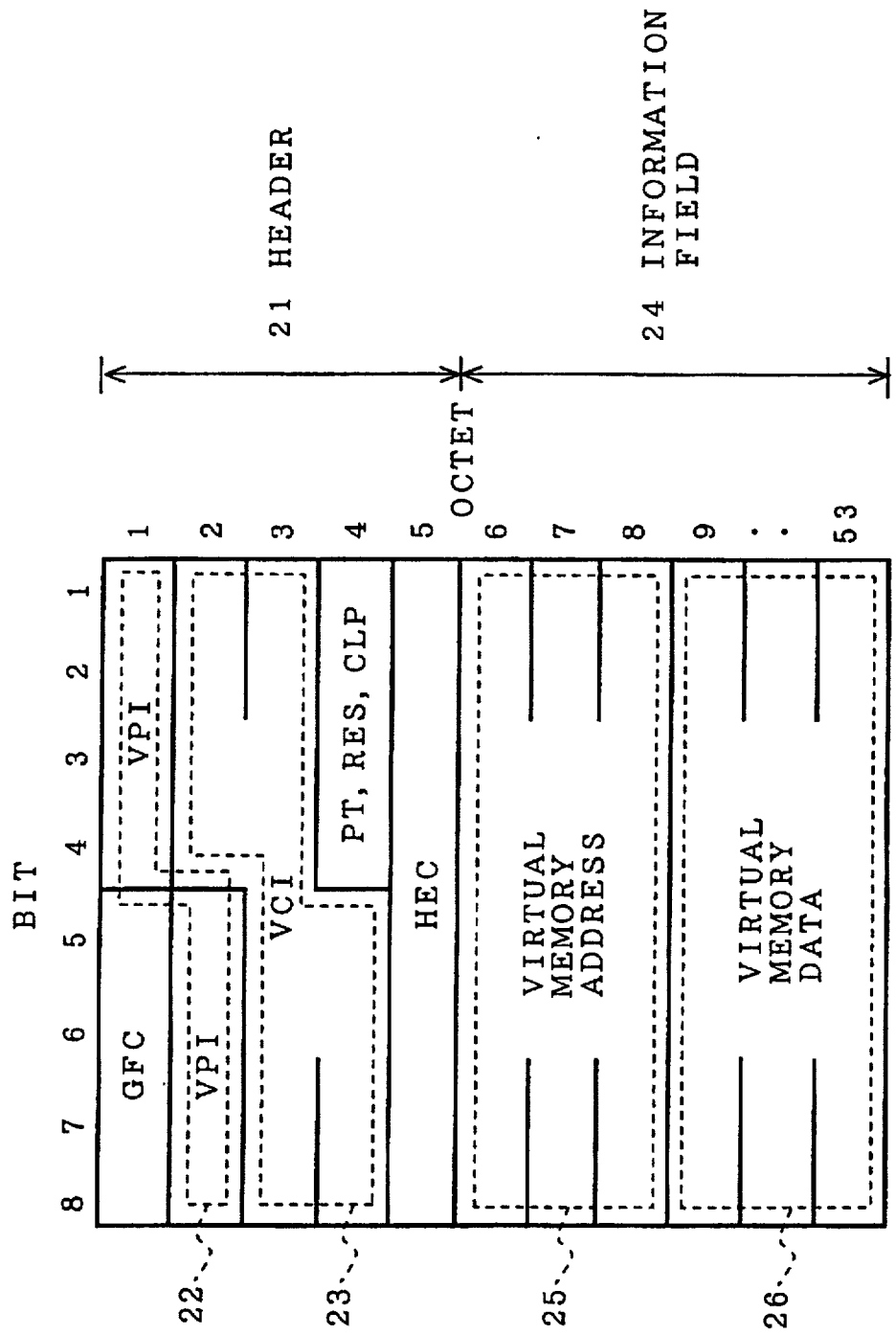

ATM COMMUNICATION DEVICE AND ATM COMMUNICATION NETWORK SYSTEM WITH TERMINAL DEVICES HAVING UNIQUELY ASSIGNED VIRTUAL CHANNEL IDENTIFIERS

BACKGROUND OF THE INVENTION

1. Field of the Invention

The present invention relates to an Asynchronous Transfer Mode (ATM) communication network system and ATM communication devices with which the ATM communication network system is constructed. The ATM communication device according to the present invention comprises an ATM switching device and an ATM terminal device.

2. Description of the Prior Art

For example, FIG. 12 is a block configuration diagram showing a configuration of a conventional ATM communication network system shown in a literature "ATM User-Network Interface Specification Version 3.1", 1994. This literature has disclosed the specification of the ATM forum. In FIG.12, the ATM communication network system comprises ATM terminal devices (or equipments) 1a to 1f and ATM switching devices (or equipments) 2a, 2c and 2e. The ATM communication network system is constructed by using the ATM terminal devices 1a to 1f and the ATM switching devices 2a, 2c and 2e.

ATM cells are transmitted and also received among the ATM terminal devices 1a to 1f. Each of the ATM terminal devices 1a to 1f includes a memory for storing each of connection control tables 3a to 3f for each of the ATM terminal devices 1a to 1f. A connection between the ATM terminal devices 1a to 1f is controlled by using the connection control table 3a to 3f stored in each of the terminal devices. Each of the connection control tables for the terminal devices 1a to 1f are made based on the relationship among target terminal devices to which ATM cells are transmitted, a virtual path identifier and a virtual channel identifier which are written into the ATM cell.

The ATM cell is transferred among the ATM terminal devices 1a to 1f passed through the ATM switching devices 2a, 2c and 2e. The ATM switching devices 2a, 2c and 2e include connection control tables 4a, 4c and 4e, respectively. A connection between the ATM terminal devices 1a to 1f is controlled by using the connection control table 4a, 4c and 4e for the switching device. Each of the connection control tables 4a, 4c and 4e for the switching devices 2a, 2c and 2e are made based on the relationship between a virtual path identifier and a virtual channel identifier which are written into a received ATM cell and a virtual path identifier and a virtual channel identifier which are written into the transmitted ATM cell.

A reference character 7ac shown in FIG.12 designates a point to point connection between the ATM terminal device 1a and the ATM terminal device 1c. As omitted from FIG.12, there are a plurality of point to point connections between all of the terminal devices 1a to 1f in a network structure.

This point to point connection is a logical connection between one ATM terminal device (for example 1a) and other ATM terminal device (for example 1c). In general, the point to point connection is a bi-directional (duplex direction) connection. A virtual path comprises one virtual channel or a plurality of virtual channels. A physical transmission path comprises one virtual path or a plurality of virtual paths. There are paths, each path comprising a virtual path or a virtual channel. A plurality of the virtual channels can be included in the connection of the virtual path. The connection of the virtual channel consists of only one virtual channel.

It is possible that each of the ATM switching devices 2a, 2c and 2e has a function of each of the ATM terminal device 1a to 1f. Accordingly, in this specification, we use and describe a ATM communication device (or equipment) instead of a pair of an ATM terminal device and an ATM switching device 1f there is no necessary to distinguish the ATM terminal device and the ATM switching device.

FIG. 13 is a diagram showing an ATM protocol structure. There are a physical layer, an ATM layer, an ATM adaptation layer and an upper or higher layer in order observed from the bottom side. The ATM adaptation layer includes a segmentation and reassembly layer and a convergence sublayer. The convergence sublayer includes a common part convergence sublayer section and a service specific convergence sublayer section.

A multiplex operation of ATM cells, a demultiplex operation of an ATM cell, and an exchanging operation of ATM cells are performed in the ATM layer. In the ATM adaptation layer, types 1 to 5 are specified according to a request from the upper layer and information is divided into cells, each cell having a fixed length. Each cell is transmitted to the upper layer and examined whether or not the transmitted information in the cell is correct.

Next, the operation of the ATM network system will be explained. At first, the preparing or setting of the connection control tables 4a, 4c and 4e for the switching devices will be explained.

In a case that a point to point connection is made in the ATM communication network as shown in FIG.12, all of the connection control tables 3a to 3f for the all of the terminal devices 1a to 1f and the connection control tables 4a, 4c and 4e for all of the switching devices 2a, 2c and 2e are made in the memory in each devices. In order to make up the connections among the ATM terminal devices 1a to 1f in a net structure, entries corresponding to the number of the connections which are handled by each of the switching devices 2a, 2c and 2e must be formed in each of the connection control tables in the switching devices. For example, the number of the entries which must be required for the connection control table 4a in the switching device 2a is five (5 entries) when the connections are made up between the ATM terminal device 1a and each of the ATM terminal devices 1b to 1f, as shown in FIG.14.

FIG. 14 is a diagram showing the contents of the connection control table 4a for the switching device in the ATM switching device 2a. The connection control table 4a for the switching device is a table used for exchanging input side information made up of a combination of a port number, a virtual path identifier (VPI) and a virtual channel identifier (VCI) with output side information. In the table 4a as shown in FIG.14, a port 0 designates a port number which is connected to the ATM terminal device 1a. In addition, port numbers 1, 2 and 3 denote port numbers which are connected to the ATM terminal device 1b, the ATM switching device 2c and 2e, respectively.

The operation that an ATM cell is transmitted from the ATM terminal device 1a to the ATM terminal device 1b will be explained.

In the ATM terminal device 1a, the virtual path identifier "VP10" and the virtual channel identifier "VC10" are added or written into the ATM cell based on the connection control table 3a in its own ATM terminal device 1a. Then, the ATM cell is transmitted to the other terminals.

The ATM switching device 2a obtains the output port number "port 1" by using the connection control table 4a based on the virtual path identifier "VP10" and the virtual channel identifier "VC10" which are added into the ATM cell described above transmitted form the port 0. After this, in the ATM switching device 2a, the virtual path identifier "VP10" and the virtual channel identifier "VC10" in the ATM cell are exchanged into the virtual path identifier "VP11" and the virtual channel identifier "VC11", respectively. The exchanged ATM cell is transmitted to the ATM terminal device 1b.

At the ATM terminal device 1b, it is recognized that the received ATM cell is transmitted form the ATM terminal device 1a based on the virtual path identifier "VP11" and the virtual channel identifier "VC11" which have been added into the received ATM cell. Then, the received ATM cell is transmitted into the internal section of the ATM terminal device 1b.

In a case that a ATM cell is transmitted from the ATM terminal device 1a to the ATM terminal device 1c, the operation of each of the ATM switching device 2c and the ATM terminal device 1c will be explained.

FIG. 15 is a block configuration diagram showing a part of the ATM communication network system for explaining the operation of the ATM switching device 2c and the ATM terminal device 1c. The explanations for components shown in FIG. 15 and the following figures which are the same components as shown in FIGS.12 to 14 in configuration and function will be omitted hereinafter in order to avoid duplicated explanations so long as there is any special explanation for them. A reference character 9 shown in FIG. 15 designates a flow of the ATM cell.

As shown in FIG. 15, the point to point connection 7ac of the virtual channel is formed between the ATM switching device 2c and the ATM terminal device 1c. At the ATM switching device 2c, the connection control table 4c is used and the virtual path identifier and the virtual channel identifier in the input ATM cell are exchanged into the virtual path identifier and the virtual channel identifier in the output ATM cell. At the ATM terminal device 1c, the virtual path identifier and the virtual channel identifier in the received ATM cell are compared with them stored in the connection control table 3c, and it is recognized that the ATM cell is transmitted for its own ATM terminal device 1c. Then, the recognized ATM cell is trapped in the ATM terminal device 1c. If it is recognized that this ATM cell is not transmitted to the ATM terminal device 1c, the ATM terminal device 1c discards the ATM cell.

Although the operations of the ATM terminal devices 1a, 1b and 1c are performed at a high speed by a hardware (H/W) under a point to point connection, there is a problem that the number of the entries in the connection control table 4c for the switching device is increased according to the increasing of the number of the ATM terminal devices 1a to 1f by which the ATM communication network system is constructed.

In order to solve the problem described above, a point to multipoint connection is used by which the number of the entries in the connection control table 4c for the switching device may be decreased as compared to the point to point connection.

FIG. 16 is a block configuration diagram showing a configuration of an ATM communication network system. The ATM communication network system has the same components of the ATM communication network system shown in FIG. 12 basically in configuration. The point to multipoint connection 8a is a virtual channel in which the ATM terminal device 1a is the original transmission device which has been predetermined.

As omitted from FIG.12, every other terminal device 1b to 1f has a point to multipoint connection. In this case, each of other terminal devices 1b to 1f becomes a transmission side.

Here, the point to multipoint connection is a logical connection formed by one ATM terminal device acting as a transmitter and other ATM terminal devices acting as receivers. In general, a ATM cell is only transmitted in one direction in the point to multipoint connection. For example, when the ATM terminal device 1a acting as a transmitter transmits an ATM cell to the ATM terminal device 1f acting as a receiver, the ATM cell is transmitted to the receiver through the point to multipoint connection including the ATM terminal device 1f. On the other hand, the other ATM terminal devices 1b to 1e receive the ATM cell from the ATM terminal device 1a. In the ATM adaptation layer in each of the ATM terminal devices 1b to 1e, a frame is assembled by using the received ATM cell, and the ATM cell is checked in the upper layer whether or not the ATM cell is transmitted to its own ATM terminal device by a software processing. If the ATM cell is not transmitted to its own ATM terminal device, the ATM cell is discarded in this ATM terminal device.

As described above, the number of entries which is equal to the number of connections handled by a ATM switching device 2a is required in the connection control table 4a in this ATM switching device 2a. On the other hand, the number of the entries becomes one entry in the point to multipoint connection 8a as shown in FIG. 17. FIG. 17 is a diagram showing the contents in the connection control table 4a for the switching device in the ATM switching device 2a when the point to multipoint connection 8a is formed.

When the ATM terminal device 1a transmits the ATM cell to the ATM terminal device 1c, the operation of the ATM terminal devices 1c and 1d will be explained. FIG. 18 is a block diagram showing a part of the ATM communication network system. In FIG. 18, a reference character 9 indicates a flow of an ATM cell and a reference number 8a denotes a point to multipoint connection. In the ATM switching device 2c, a virtual path identifier and a virtual channel identifier in a received ATM cell are exchanged to a virtual path identifier and a virtual channel identifier in an output ATM cell by using the connection control table 4c. At the ATM terminal devices 1c and 1d, the received ATM cells are recognized as the ATM cells to be transmitted or connected to the ATM terminal devices 1c and 1d by comparing the virtual path identifier and the virtual channel identifier in the received ATM cells with the connection control tables 3c and 3d, and then the received ATM cell is trapped in the ATM terminal devices 1c and 1d. If the received ATM cell is another connection cell to be connected to another ATM terminal device, the received ATM cell is discarded.

FIG. 19 is a diagram showing a configuration of a circuit system of a cell assembling LSI SARA-R which is disclosed in a literature "SARA Chipset Technical Manual", Edition 4A, 1994, Transwitch corporation. As shown in FIG. 19, the circuit system comprises a cell assembling LSI 61, a packet memory 62, a control information memory 63, a processor interface (processor I/F) 66, and a cell interface (cell I/F). The control information memory 63 comprises a virtual channel (VC) table 64 and a virtual path (VP) table 65.

The cell assembling LSI 61 performs a part of the function of the ATM layer and a part of the function of the ATM adaptation layer. The other part of the function of the ATM layer is performed by a hardware and the other part of the function of the ATM adaptation layer is executed by software. The packet memory 62 is used when the packet is assembled based on the ATM cell. A virtual path identifier to be received for a connection to be connected is stored in the virtual path identifier table 65 in the control information memory 63. A virtual channel identifier to be received for a connection to be connected is stored in the virtual channel identifier table 64. The processor interface 66 is used for accessing between a processor executing the other part of the function of the ATM adaptation layer and a processing in the upper layer and a packet memory 62. The cell interface 67 is connected to a hardware performing the other part of the function of the ATM layer.

The cell assembling LSI 61 recognizes whether or not the transmitted ATM cell including a virtual path identifier and a virtual channel identifier must be received by the hardware processing by using the virtual path identifier table 65 and the virtual channel identifier table 64. However, like the ATM communication network system described above, the packet is transmitted to the processor through the packet memory 62 and then the ATM cell is checked whether or not the ATM cell is to be received by a software processing by using the packet when the ATM cell is not recognized by using the virtual path identifier and the virtual channel identifier in the ATM cell.

Although the number of the entries in each of the connection control tables 4a to 4c for the switching devices in a point to multipoint connection is increased according to the increasing the number of the ATM terminal devices forming the ATM communication network system, the rate of increasing of the number of the entries is very small when compared with that of a point to point connection. However, as described above, there is a drawback that the processing in the ATM terminal device as the receiving side becomes complicated.

FIG. 20 is a diagram showing a block circuit diagram of another conventional ATM communication system disclosed in the literature described above. In the ATM communication network system as shown in FIG. 20, each of memories 5a to 5f is incorporated in each of the ATM terminal devices 1a to 1f. The entire of the memories 5a to 5f forms one commonly shared memory. The commonly shared memory is used commonly by a plurality of the ATM terminal devices 1a to 1f.

The operation of the ATM communication network system will be explained. For example, when the ATM terminal device 1a replaces a data item stored in the commonly shared memory with new data item, the new data item is stored into the memory 5a which is the memory of its own ATM terminal device 1a and the new data item with address data used for replacing the new data item in the commonly shared memory is also transmitted to the other ATM terminal devices 1b to 1f. Each of the ATM terminal devices 1b to 1f replaces the data item stored in each of the memories 5b to 5f with new data item by using the address data after each of the ATM terminal devices 1b to 1f receives the new data item and the address data.

As observing the above operations in macro, each of the memories 5a to 5f has the same data at the same time and the entire of the ATM terminal devices 1a to 1f has one memory space which is commonly shared.

The information having an ATM cell structure as shown in FIG. 21 is transmitted to the ATM terminal device 1a, and then the data in the commonly shared memory is replaced with the received information. FIG. 21 is a diagram showing a construction of an ATM cell. The ATM cell consists of a cell header 21 and an information field 24. In the cell header 21, a virtual path identifier 22 and a virtual channel identifier 23 are stored. In the information field 24, an address information 25 (virtual memory address) and a changing data item (virtual memory data) in the commonly shared memory are stored. Accordingly, the size or length of the information field 24 is reduced by the length used for the address information 25, so that there is a problem that a traffic of the ATM communication network system becomes increased.

Next, we will summarize drawbacks or problems in the conventional ATM communication network system. The drawbacks or the problems are as follows:

Firstly, when the connections are made to all of the conventional ATM communication devices which construct an ATM communication network system, entries corresponding to the number of the connections relayed by each own switching device in each of the ATM communication devices 2a, 2c and 2e are required in a connection control table for a switching device. In addition, the number of the entries is increased corresponding to the number of the ATM communication devices forming the ATM network system. Thereby, the size of the memory forming each of the connection control tables 4a, 4c and 4e for the switching devices is increased.

Secondly, in the conventional ATM network system described above, the point to multipoint connection is used in order to decrease the number of the entries of the connection control table for the switching device. In the ATM communication device, the processing in order to check or recognize whether or not a received ATM cell is transmitted to its own ATM communication device is performed by using a software in the upper layer over the ATM adaptation layer. Thereby, the performance of the ATM communication device becomes decreased.

Thirdly, the one commonly shared memory is constructed for a plurality of ATM communication devices in the conventional ATM communication network system. Change information 26 and address information 25 for the change information are stored into the information field 24 in a ATM cell in order to replace the information in the commonly shared memory. Thereby, the effective size or length in the information field in an ATM cell is decreased and this decreasing causes the increasing of the traffic rate in the ATM communication network system.

SUMMARY OF THE INVENTION

The present invention has been made in attempts to solve the drawbacks or the problems included in the conventional ATM communication device and the conventional ATM communication network system and therefore has objects as follows.

A first object of the present invention is to provide an ATM communication device having a high performance capable of decreasing a memory area size for a connection control table used in an ATM switching device even if the number of the ATM communication devices is increased and to provide an ATM communication network system constructed with a plurality of the ATM communication devices.

A second object of the present invention is to provide an ATM communication device capable of processing an ATM cell received by an ATM terminal device at a high speed and to provide an ATM communication network system constructed with a plurality of the ATM communication devices.

A third object of the present invention is to provide an ATM communication device capable of having the information size in an ATM cell to be transmitted to another ATM communication device (up to the entire field size of an information field in the ATM cell) and of decreasing a network traffic rate in a case that memories in a plurality of the ATM communication devices forming an ATM communication network system are commonly shared as one memory and to provide an ATM communication network system constructed by the plurality of the ATM communication devices.

In accordance with one aspect of the present invention, there is provided an asynchronous transfer mode (ATM) communication device, a plurality of the ATM communication devices constructing a ATM communication network system, each ATM communication device comprising: memory means including a connection control table for storing a virtual path identifier and a virtual channel identifier assigned for each ATM communication device; an ATM cell transmission section for transmitting an ATM cell including the virtual path identifier assigned to the ATM communication device as a transmission side from which the ATM cell is transmitted and the virtual channel identifier assigned to other ATM communication devices as a receiving side by which the ATM cell is received according to the virtual path identifier and the virtual channel identifier stored in the connection control table in the memory means; and an ATM cell receiving section for comparing the virtual channel identifier for the ATM communication device of the receiving side stored in the ATM cell with the virtual channel identifier assigned to the ATM communication device as the receiving side stored in the connection control table in the memory means in the ATM communication device as the receiving side, when both of the virtual channel identifiers is agreed to each other, the ATM communication device of the receiving side traps the ATM cell, and if not agreed to each other, the ATM communication device of the receiving side discards the ATM cell.

In accordance with another preferred embodiment according to the present invention, there is provided an asynchronous transfer mode (ATM) communication network system constructed by connecting a plurality of ATM communication devices to each other through connections, each of the plurality of ATM communication devices having a transmission function to transmit an ATM cell and a receiving function to receive the ATM cell, characterized in that each of the plurality of ATM communication devices comprises: memory means including a connection control table for storing a virtual path identifier and a virtual channel identifier assigned to each ATM communication device; an ATM cell transmission section for transmitting an ATM cell including the virtual path identifier assigned to the ATM communication device as a transmission side from which the ATM cell is transmitted and the virtual channel identifier assigned to other ATM communication devices as a receiving side by which the ATM cell is received according to the virtual path identifier and the virtual channel identifier stored in the connection control table in the memory means; and an ATM cell receiving section for comparing the virtual channel identifier for the ATM communication device of the receiving side stored in the ATM cell with the virtual channel identifier assigned to the ATM communication device as the receiving side stored in the connection control table in the memory means in the ATM communication device as the receiving side, when both of the virtual channel identifiers is agreed to each other, the ATM communication device of the receiving side traps the ATM cell, and if not agreed to each other, the ATM communication device of the receiving side discards the ATM cell, wherein by using the plurality of ATM communication devices, a point to multipoint connection for the virtual path identified by the virtual path identifier added in the ATM cell transmitted from the ATM communication device s the transmission side is constructed among the plurality of ATM communication devices.

In addition, in the ATM communication network system described above, the virtual channel identifier for designating all of the plurality of ATM communication devices is further added into the connection control table in which information relating to each of the plurality of ATM communication devices is stored, the ATM cell transmission section adds the virtual channel identifier for designating all of the plurality of ATM communication devices into the ATM cell and transmits the ATM cell to the plurality of ATM communication devices, and the ATM cell receiving section receives the ATM cell and compares the virtual channel identifier in the ATM cell with the virtual channel identifier indicating all of the plurality of ATM communication devices stored in the connection control table, the ATM communication device as the receiving side recognizes that all of the ATM communication devices are the receiving side and traps the ATM cell when both of the virtual channel identifiers are agreed to each other. Accordingly, in the ATM communication network system constructed by the plurality of ATM communication devices, because a point to multipoint connection as a virtual path and virtual channel identifier assigned to each ATM communication device are used, the number of the entries in the connection control table in the ATM communication device (specifically, in the ATM switching device in the ATM communication device) can be reduced. The judgment whether or not the received ATM cell is transmitted to its own ATM communication device can be performed by a hardware processing in a lower layer than the ATM adaptation layer.

In accordance with another preferred embodiment according to the present invention, there is provided the ATM communication device described above further comprising second memory means constructing one commonly shared memory space in the plurality of the ATM communication devices and commonly used among the plurality of the ATM communication devices.

Moreover, in accordance with another preferred embodiment of the present invention, there is provided the ATM communication device described above, wherein each of the plurality of ATM communication devices further comprises second memory means which constructs one commonly shared memory space and is commonly used among the plurality of ATM communication devices, the ATM cell transmission section stores change information to be changed in the commonly shared memory space into the information field in the ATM cell and address information designating the address of the change information in the commonly shared memory space into all of or a part of the field to store the virtual path identifier and the virtual channel identifier and then transmits the ATM cell to other ATM communication devices, and the ATM cell receiving section reads the address information in the commonly shared memory space stored in the field of the virtual path identifier and the virtual channel identifier in the ATM cell, and changes the information in the second memory means in the ATM communication device as the receiving side based on the change information designating the commonly shared memory space stored in the ATM cell.

Furthermore, in the ATM communication network system described above, the address information addressing the change information in the commonly shared memory space to be changed and transmitted from the ATM cell transmission section to the other ATM communication devices is stored into a segmentation and reassembly sublayer protocol data unit for an ATM adaptation layer type 3 or 4 in addition to the field of the virtual path identifier and the virtual channel identifier in the ATM cell.

Moreover, in the ATM communication network system described above, the segmentation and reassemble sublayer protocol data unit comprises a segmentation and reassemble sublayer protocol data unit header field, a segmentation and reassemble sublayer protocol data unit trailer field, a segmentation and reassemble sublayer protocol data unit payload field and a multiplexing ID field, the address information is stored into the multiplexing ID field in addition to the field of the virtual path identifier and the virtual channel identifier, and the change information is stored in the segmentation and reassemble sublayer protocol data unit payload field.

In addition, in the ATM communication network system described above, the address information addressing the change information in the commonly shared memory space to be changed and transmitted from the ATM cell transmission section to the other ATM communication devices is stored into a common part convergence sublayer protocol data unit for an ATM adaptation layer type 3 or 4 in addition to the field of the virtual path identifier and the virtual channel identifier in the ATM cell.

Furthermore, in the ATM communication network system described above, the common part convergence sublayer protocol data unit comprises a common part convergence sublayer protocol data unit header field, a common part convergence sublayer protocol data unit trailer field, a common part convergence sublayer protocol data unit payload field, a beginning tag field and an end tag field, the address information is stored into the beginning tag field or the end tag field in addition of the field of the virtual path identifier and the virtual channel identifier, and the change information is store in the common part convergence sublayer protocol data unit payload field.

Moreover, in the ATM communication network system described above, the address information addressing the change information in the commonly shared memory space to be changed and transmitted from the ATM cell transmission section to the other ATM communication devices is stored into a common part convergence sublayer protocol data unit for an ATM adaptation layer type 5 in addition to the field of the virtual path identifier and the virtual channel identifier in the ATM cell.

Furthermore, in the ATM communication network system described above, the common part convergence sublayer protocol data unit comprises a common part convergence sublayer protocol data unit payload field, a common part convergence sublayer protocol data unit trailer field and a user-to-user indication field, the address information is stored into the user-to-user indication field in addition to the field of the virtual path identifier and the virtual channel identifier, and the change information is store in the common part convergence sublayer protocol data unit payload field. Accordingly, because the address information in the commonly shared memory space is stored into the virtual path identifier field and the virtual channel identifier field or the protocol data unit in the ATM adaptation layer in addition to the field of the virtual path identifier and the virtual channel identifier, the size of the information to be transmitted by the information field in one ATM cell can be increased as compared to conventional ATM communication network systems as the prior art.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing the contents of a connection control table of an ATM terminal device use in the ATM terminal device as shown in FIG.2.

FIG. 4 is a diagram showing the contents of a connection control table of an ATM switching device use in the ATM switching device in a point to multipoint connections.

FIG. 6 is a diagram showing the contents of the connection control table for an ATM terminal device in an ATM communication network system according to the embodiment 2 of the present invention.

FIG. 14 is a diagram showing the contents of a connection control device used in the conventional ATM switching device of a prior art.

FIG. 17 is a diagram showing a connection control table used in a switching device in point to multipoint connections according to a prior art.

FIG. 21 is a diagram showing an ATM cell structure of a prior art.

DESCRIPTION OF THE PREFERRED EMBODIMENTS

Hereinafter, preferred embodiment of the present invention will now be explained with reference to the accompanying drawings.

Embodiment 1.

Figure 1:
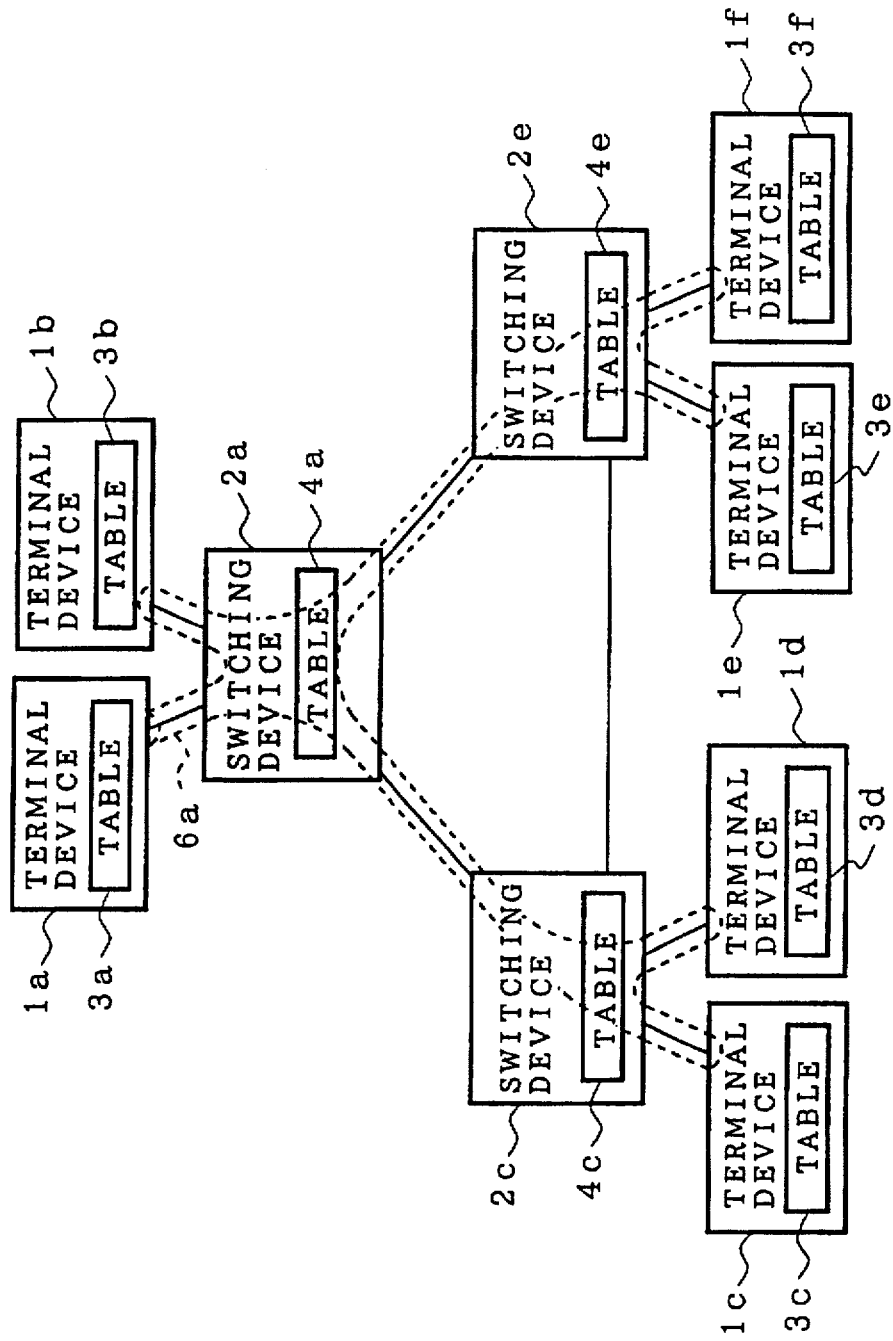
FIG. 1 is a block configuration diagram of an ATM communication network system according to the embodiment 1 of the present invention.

FIG. 1 is a block configuration diagram of an ATM communication network system according to the embodiment 1 of the present invention. The ATM communication network system shown in FIG.1 comprises a plurality of ATM terminal devices (or equipments) 1a to 1f, a plurality of ATM switching device (or equipments) 2a, 2c and 2e. The ATM terminal devices 1a to 1f have memories (memory means) for storing connection control tables 3a to 3f for the ATM terminal device. In addition, connection control tables 4a, 4c and 4e used for the ATM switching device are included in the ATM switching devices 2a, 2c and 2e.

In FIG.1, a reference character 6a designates a point to multipoint connection. The point to multipoint connection is a virtual path in which the ATM terminal 1a acts as a transmitter. Although not shown in FIG. 1, a plurality of point to multipoint connections where each of the ATM terminal devices other than the ATM terminal device 1a acts as a transmitter may be formed in the ATM communication network system.

Figure 2:
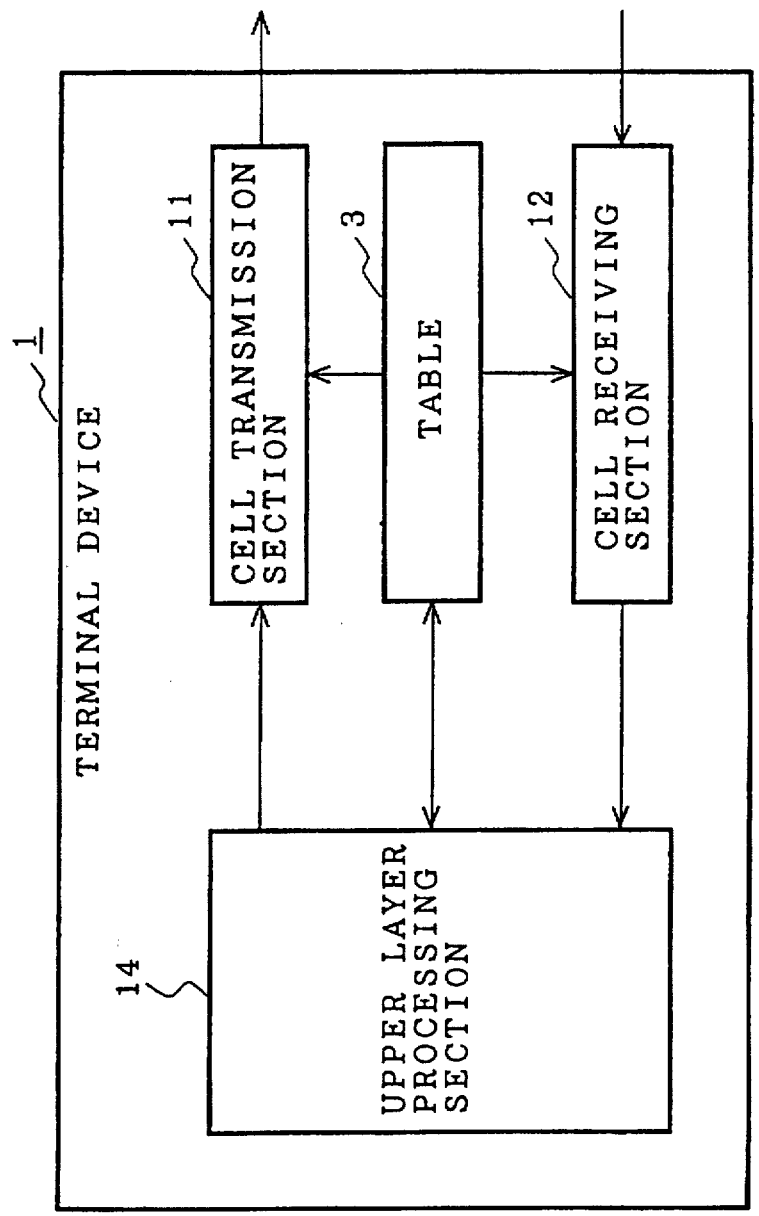
FIG. 2 is an internal block circuit diagram of an ATM terminal device in the ATM communication device constructing the ATM communication network system as shown in FIG.1.

FIG. 2 is an internal block circuit diagram of an ATM terminal device in each of the ATM communication devices forming the ATM communication network system as shown in FIG. 1. As shown in FIG. 2, the ATM terminal device 1 (hereinafter, we use a reference number 1 as a group of the ATM terminal devices 1a to 1f or as a group of the ATM terminal devices and the ATM switching devices) comprises a cell transmission section 11, a cell receiving section 12, a connection control table 3 (memory means; hereinafter we use a reference number 3 as a group of the connection control tables 3a to 3f) and an upper or higher layer processing section 14. The cell transmission section 11 has a transmission function of ATM cells in an ATM layer and a physical layer. The cell receiving section 12 is capable of receiving ATM cells in the ATM layer and the physical layer. The connection control table 3 stores data or information relating to the relationships between virtual path identifier and each ATM terminal device which is with relation to its own ATM terminal device 1, and between virtual channel identifier and each ATM terminal device which is with relation to its own ATM terminal device 1. The upper layer processing section 14 handles upper functions for layers over the ATM adaptation layer.

FIG. 3 is a diagram showing the contents of the connection control table 3 in the ATM terminal device 1 as shown in FIG. 2. The connection control table 3 stores an ATM terminal device address control table 15 and a virtual path connection control table 16. Each of data items stored in the ATM terminal device address control table 15 designates the ATM terminal device 1 from which an ATM cell is transmitted to other ATM terminal devices when an ATM cell transmission process. In addition, the ATM terminal device address control table 15 provides the virtual channel identifier for the designated ATM terminal device as the transmission side. This virtual channel identifier is assigned ahead of time to each of the ATM terminal devices 1a to 1f uniquely. By using the virtual path connection table 16, the ATM terminal device acting as the transmitter is recognized when an ATM cell is received at a receiving ATM terminal device and then the virtual path identifier for the ATM terminal device acting as a transmitter is assigned to the received ATM cell. This virtual path identifier is also assigned ahead of time to each of the ATM terminal devices 1a to 1f uniquely.

Next, the operation of the ATM communication network system described above will be explained.

In FIG. 1, the virtual path in the point to multipoint connection 6a is used when an ATM cell is transmitted from the ATM terminal device 1a to the ATM terminal device 1f. As shown in FIG. 2, the virtual path identifier "VP1" and the virtual channel identifier "VC6" are recognized by the ATM cell transmission section 11 in the ATM terminal device 1a based on data stored in the virtual path connection control table 16 and the ATM terminal device address control table 15. The virtual path identifier "VP1" has been assigned to its own ATM terminal device 1a and stored in the virtual path connection control table 16 in the connection control table 3. The virtual channel identifier "VC6" has been assigned to its own ATM terminal device 1f as the receiving side and stored in the ATM terminal address control table 15. The recognized virtual path identifier "VP1" and the virtual channel identifier "VC6" are stored in the ATM cell to be transmitted and then transmitted to other terminal devices through the ATM communication network.

Thus, when the virtual path identifier "VP" (such as VP1, VP2, . . . ) is given, in the ATM communication network system as shown in FIG. 1, each of point to multipoint connections is uniquely assigned to each virtual path. In addition, an ATM terminal device acting as a receiver is recognized based on the virtual path identifier stored in an ATM cell received at the ATM terminal device acting as a receiver. On the other hand, when the virtual channel identifier "VC" is assigned, the ATM terminal device 1f can be recognized uniquely as the receiver to which the ATM cell is transmitted in the plurality of the ATM terminal devices 1a to 1f.

The received ATM cell described above is exchanged based on the virtual path identifier "VP1" at the ATM switching devices 2a, 2c and 2eas shown in FIG. 1. All of the ATM cells to be transmitted are transferred to the ATM terminal devices through the ATM switching devices 2a, 2c and 2e.

FIG. 4 is a diagram showing the contents of the connection control table 4a for the switching device in the ATM switching device 2a in the point to multipoint connection 6a described above.

As shown in FIG. 4, an entry corresponding to the point to multipoint connection 6a is determined based on a combination of the virtual path identifier VP1 of the receiving side (input side) and the virtual path identifier VP1 of the transmission side (output side). In this case, the number of the entries is only one. Because no virtual channel identifier is changed or modified by the ATM switching device, there is no field for the virtual channel identifier in the entries in the connection control table in the ATM switching device 4 described above. In FIG. 4, the first line designates the point to multipoint connection in which an ATM cell is transmitted from the ATM terminal device 1a to the other ATM terminal devices.

On the other hand, in the ATM communication terminal device 1f as shown in FIG. 1, the ATM cell is transmitted from the ATM terminal device 1a acting as the transmitter to the ATM terminal device 1f acting as the receiver through the virtual path 6a. Then, the ATM cell is received by the ATM terminal device 1f. As shown in FIG. 2, the ATM terminal device address control table 15 in the connection control table 3 (3f) is referenced in the ATM cell receiving section 12 in the ATM terminal device acting as the receiver. When the virtual identifier VC6 stored in the received ATM cell is equal to the virtual channel identifier in the ATM terminal device address control table 15 which is assigned to its own ATM terminal device 1f, the received ATM cell is trapped in order to handle it by the upper layer processing section 14. Thus, the receiving process such as the recognition process described above for received ATM cells is performed by the cell receiving section 12 as the ATM layer in the ATM terminal device 1f. Therefore it is not required to perform the receiving process by a software at the upper layer in this ATM terminal devices 1a to 1f, so that this processing can be executed at a high speed rate. At this time, the virtual path connection control table 16 in the connection control table 3f is referenced, the ATM terminal device 1f recognizes that the transmission side is the ATM terminal device 1a when the virtual path identifier in the received ATM cell is the VP1. Although the ATM cell which is transmitted from the ATM terminal device 1a to the ATM terminal device 1f is also received through the virtual path 6a at other ATM terminal devices 1b to 1e, in this case, the virtual channel identifier stored in the received ATM cell is not equal to the virtual channel identifier assigned to its own each of the ATM terminal devices 1b to 1e. Therefore each of the other ATM terminal devices 1b to 1e discards the received ATM cell. Further, the discarding process of the received ATM cell is performed in the cell receiving section 12 as the ATM layer in each of the other ATM terminal devices 1b to 1e by a hardware processing, not executed in the upper layer by a software processing. Therefore the processing at the ATM terminal device can be performed at a high speed rate.

The ATM switching devices 2a, 2c and 2e as shown in FIG. 1 perform an exchanging process in the virtual path level or class when they relay the ATM cells between the ATM terminal devices. Because only exchange information such as the virtual path connection 6a is required in the relay processing at the ATM switching device, the connection control table 4a, 4c and 4e for the switching device in each of the ATM switching devices 2a, 2c and 2e stores the exchanging information, not the virtual channel identifier. In other words, it is not required to control and store any virtual channel identifier in the connection control tables 4a, 4c and 4e. The number of the entries in each of the connection control tables 4a, 4c and 4e for each switching device is increased according to the increasing of the number of the ATM terminal devices 1a to 1f by which the ATM communication network system is constructed. However, the rate in the case of the point to multipoint connection described above is slightly increased when compared with the rate in the conventional point to point connection case.

Next, the operation of the ATM switching device 2c and the ATM terminal devices 1c and 1d when an ATM cell is transferred from the ATM terminal device 1a to the ATM terminal device 1c will be explained.

Figure 5:
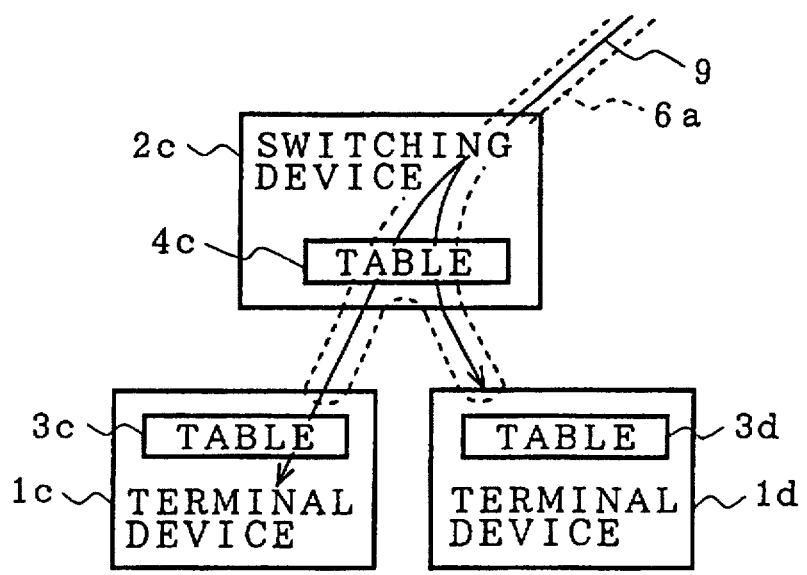
FIG. 5 is a block diagram of a part of the ATM communication network system to explain the operation of the ATM switching device and the ATM terminal device in the point to multipoint connections as shown in FIG. 4.

FIG. 5 is a block diagram of a part of the ATM communication network system to explain the operation of the ATM switching device 2c and the ATM terminal devices 1c and 1d in the point to multipoint connections as shown in FIG. 4. A reference number 9 designates a flow of the ATM cell and a reference character 6a denotes the point to multipoint connection. In this case, the ATM switching device 2c uses the connection control table 4c and a virtual path identifier in an input (or received) ATM cell is changed to the virtual path identifier of an output ATM cell. The virtual channel identifier in the input ATM cell is not changed in the ATM switching device.

The ATM terminal device 1c recognizes that the received ATM cell is transmitted to its own ATM terminal device 1c passed through the point to multipoint connection 6a based on the comparison result when the virtual path identifier and the virtual channel identifier in the received ATM cell are compared with the virtual path identifier and the virtual channel identifier which have been predetermined and stored in the connection control table 3c. This recognized ATM cell is trapped in its own internal section in the ATM terminal device 1c.

On the other hand, the ATM terminal device 1d recognizes that the received ATM cell is not transmitted to its own ATM terminal device 1d passed through the point to multipoint connection 6a based on the comparison result when the virtual path identifier and the virtual channel identifier in the received ATM cell are compared with the virtual path identifier and the virtual channel identifier which have been predetermined and stored in the connection control table 3d. This recognized ATM cell is discarded in its own internal section in the ATM terminal device 1d.

Because each processing in the ATM terminal devices 1c and 1d is performed by the cell receiving section 12 as the ATM layer as described above in detail, the above processing is performed by the hardware processing and it is not required to use any software for the above processing.

As described in detail, in the ATM communication network system according to the embodiment 1 of the present invention, the number of the entries in the connection control table 3 in the ATM switching device can be decreased as comparing with conventional ATM communication network system in the prior art. In addition, in each of the ATM terminal devices 1, the recognition process whether or not a received ATM cell is transmitted to its own ATM terminal device by the ATM layer which is a lower level than the ATM adaptation layer. Therefore it can be performed at a high speed rate to execute it by the hardware processing.

Embodiment 2.

In the ATM communication network system according to the embodiment 1 described above, although the virtual channel identifier for each of the ATM terminal devices 1a to 1f in the ATM terminal device address control table 15 in the connection control table 3, a virtual channel identifier indicating all of the ATM terminal devices 1a to 1f is assigned and added into the connection control table 3 in the ATM communication network system of the embodiment 2.

FIG. 6 is a diagram showing the contents of the connection control table 3 for the ATM terminal device in the ATM communication network system according to the embodiment 2 of the present invention.

As shown in FIG. 6, the ATM terminal device address control table 17 is made in the connection control table 3. In the ATM terminal device address control table 17, the address of a target ATM terminal device to which an ATM cell is transmitted is specified when the ATM cell is transmitted and the relationship between the target ATM terminal device and its own virtual channel identifier is stored. As comparing the ATM terminal device address control table 17 of the embodiment 2 with the ATM terminal device address control table 15 of the embodiment 1, the difference is that the virtual channel identifier VC0 which is assigned to all of the ATM communication devices 1a to 1f are added in the ATM terminal device address control table 17.

Next, the operation of the ATM communication network system according to the embodiment 2 will be explained.

When an ATM cell is broadcasted from the ATM terminal device 1a to the other ATM terminal devices 1b to 1f at the same time (see FIG. 1), the virtual path 6a is used. In the ATM cell transmission section 11 in the ATM terminal device 1a acting as the transmitter, the virtual path identifier VP1 assigned to its own ATM terminal device 1a is recognized by using the virtual pass connection control table 15 and the virtual channel identifier VC0 to be assigned to all of the ATM terminal devices 1b to 1f as the target sides is also recognized from the ATM terminal device address control table 17 (see FIG. 2). The recognized virtual pass identifier VP1 and the virtual channel identifier VC0 are stored in a header section of the ATM cell and then transmitted to the ATM terminals 1b to 1f through the virtual path 6a.

On the other hand, at the ATM terminal devices or the target ATM terminal devices 1b to 1f acting as the receivers, the ATM cell transmitted from the ATM terminal 1a is received (see FIG. 1). In the cell receiving section 12 in each of the ATM terminal devices 1b to 1f as the receiving sides, the ATM terminal device address control table 17 in the connection control table 3 is referenced (see FIG. 2), and the virtual channel identifier VC0 used for the broadcasting transmission is recognized. After the virtual channel identifier VC0 is recognized, the received ATM cell is trapped into the ATM terminal devices 1b to 1f in order to pass it to each of the upper layer processing section 14.

As described above in detail, in the ATM communication network system of the embodiment 2, an ATM cell can be broadcasted to a plurality of the ATM terminal devices at the same time through the virtual path 6a in the point to multipoint connection.

Embodiment 3.

In the ATM communication network system according to the embodiment 3, a memory (second memory means) is further provided into each of the ATM communication devices. These memories in the ATM communication devices are commonly shared at the same time as one memory space. Thus, the memories in all of the ATM communication devices construct one memory space which can be shared commonly at the same time.

Figure 7:
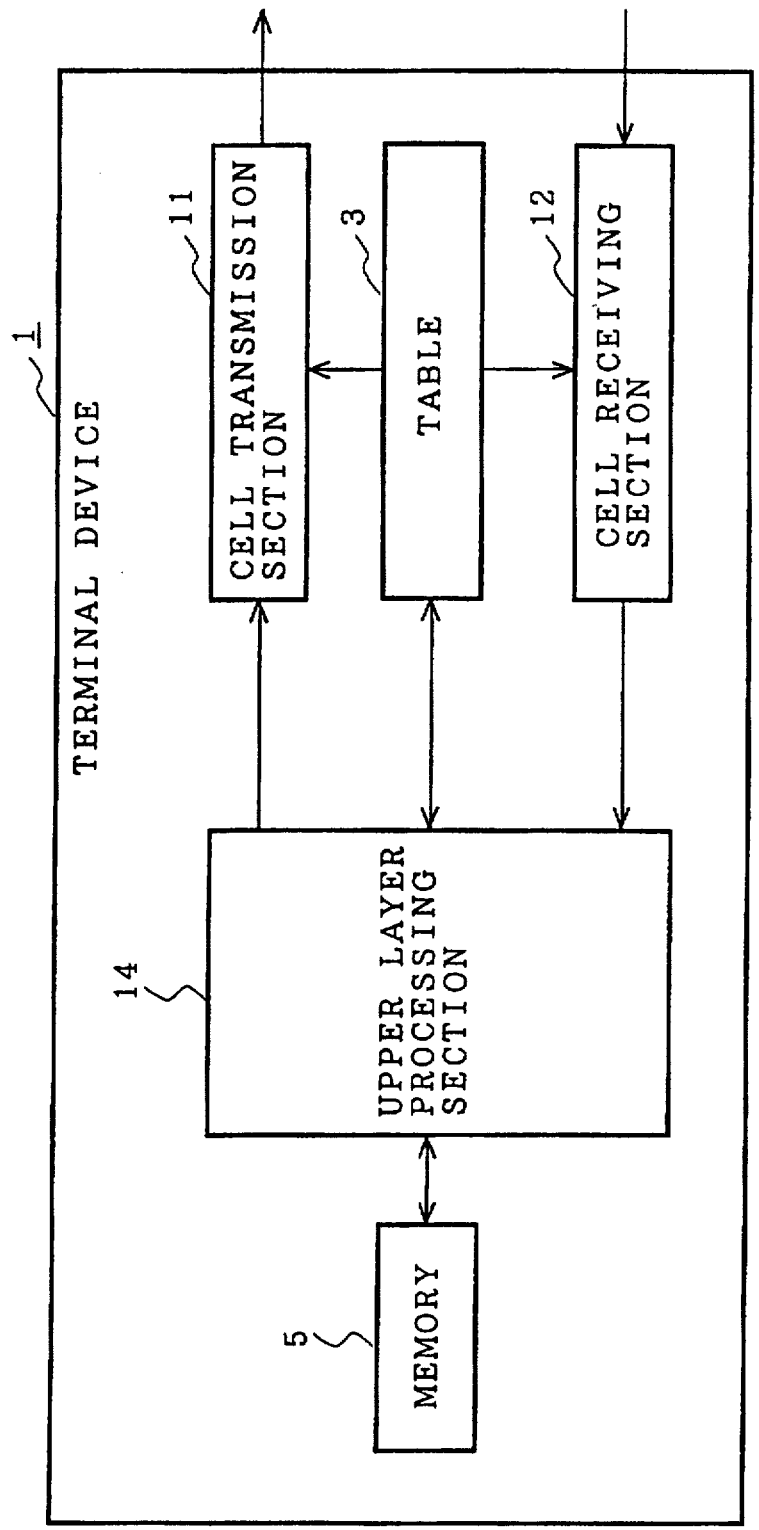
FIG. 7 is a block circuit diagram of an ATM communication device in an ATM communication network system according to the embodiment 3 of the present invention.

FIG. 7 is a block circuit diagram of the ATM communication device in the ATM communication network system according to the embodiment 3 of the present invention. As shown in FIG. 7, the memory 5 (second memory means) is added into each of the ATM terminal devices 1a to 1f. These memories 5 incorporated in the ATM terminal devices 1a to 1f are commonly shared to each other and constructs one memory space.

Figure 8:
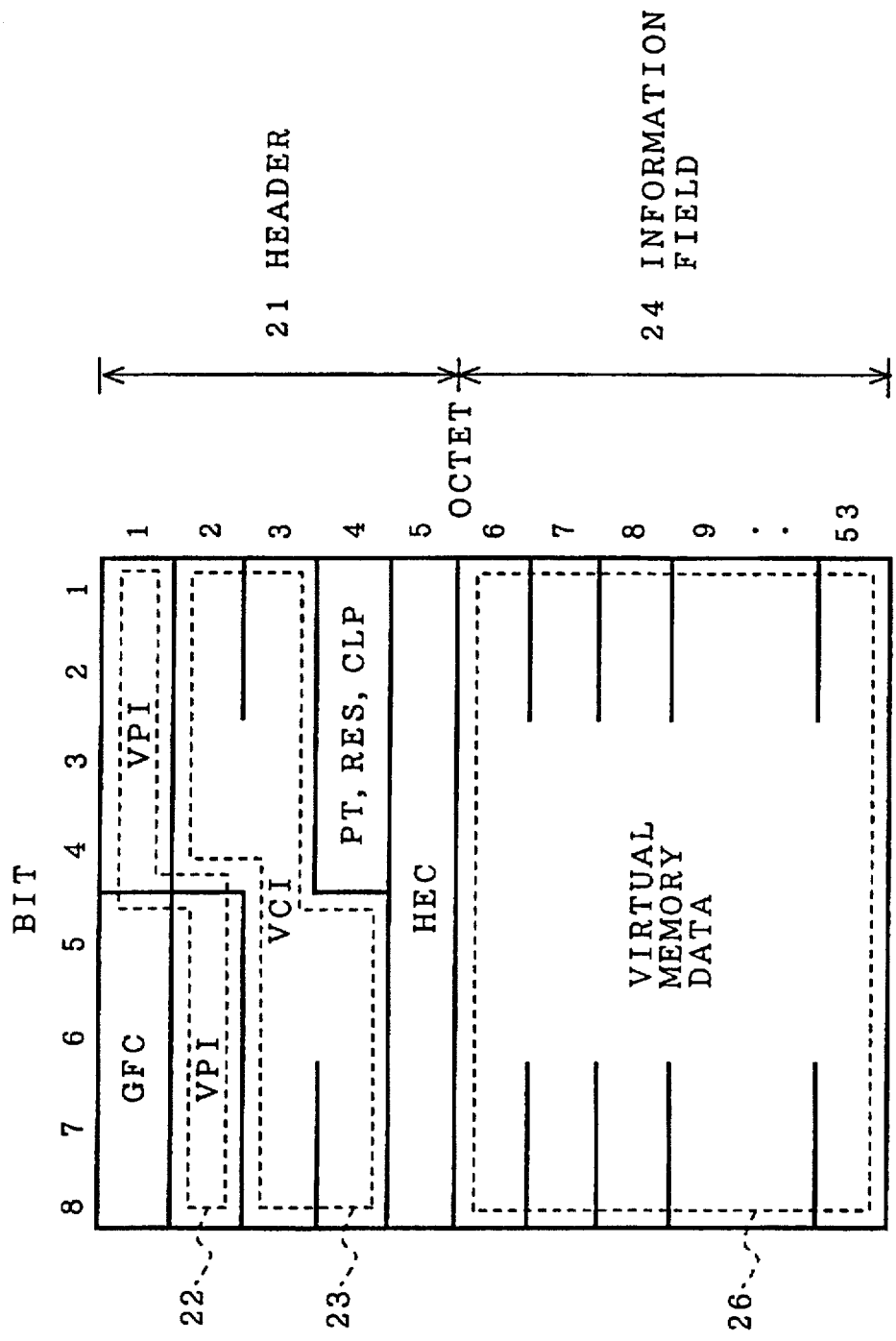
FIG. 8 is a diagram showing a configuration of an ATM cell used for the ATM communication network system as shown in FIG. 7.

FIG. 8 is a diagram showing the configuration of an ATM cell used for the ATM communication network system as shown in FIG. 7. The ATM cell comprises a cell header 21 and an information field 24. The cell header 21 store the virtual path identifier 22 and the virtual channel identifier 23. Address information addressing data stored in the commonly shared memory is stored into the virtual path identifier 22. Address information addressing data stored in the commonly shared memory is stored in the virtual channel identifier 23 and the virtual memory information 26 in the commonly shared memory is stored in the information field 24.

Figure 20:
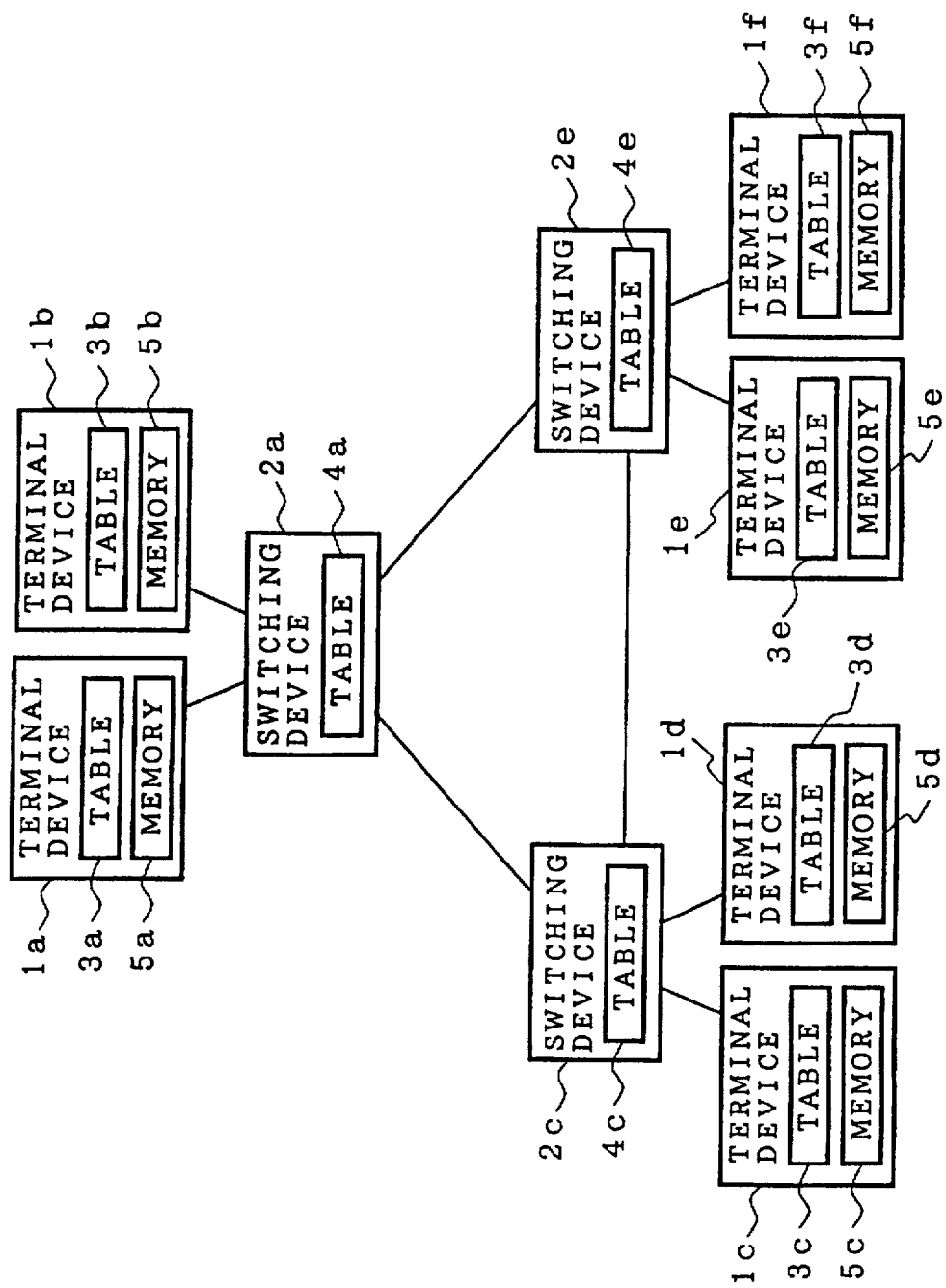
FIG. 20 is a block circuit diagram of an ATM network system according to a prior art.

Next, the operation of the ATM communication network system according to the embodiment 3 will be explained. With reference to FIG. 20 which has been used in the explanation in the prior art section, the case that the ATM terminal device 1a changes or replaces the information stored in the commonly shared memory will be explained.

When the ATM terminal device 1a changes the contents stored in the memory 5 in its own ATM terminal device 1a, the address information addressing the contents stored in the commonly shared memory and the changed contents are broadcasted or transmitted to other ATM terminal devices 1b to 1f in order to change the contents stored in the memories 5 in the other terminal devices 1b to 1f at the same time. In this case, the address information addressing the addresses of the changed contents in the commonly shared memory is stored into all of or a part of the field of the virtual path identifier 22 and the virtual channel identifier 23.

For example, when the information having the first 48 bytes from the address A is changed, address information designating the address A is stored in all of or a part of the field of the virtual path identifier 22 and the virtual channel identifier 23, and the information of 48 bytes is stored into the information field 24 in an ATM cell. The ATM terminal device is then transmitted as a broadcasting ATM cell to other ATM terminal devices. The broadcasting ATM cell is an ATM cell to be transmitted to a plurality of other ATM cells at the same time.

The ATM terminal devices 1b to 1f recognize that the received ATM cell is the broadcasting ATM cell transmitted from the ATM terminal device 1a based on the virtual path identifier 22 and the virtual channel identifier 23 in the received ATM cell when receiving the ATM cell. At the same time, the ATM terminal devices 1b to 1f recognize the address A addressing data stored in the commonly shared memory space and then replace the contents of the first 48 bytes from the address A in each of the memories 5b to 5f with the information field in the received ATM cell (a broadcasting ATM cell).

As described above in detail, in the embodiment 3 of the present invention, because address information is not stored in the information field 24 in an ATM cell (or a broadcasting ATM cell) in the ATM communication network system according to the embodiment 3, the size or length of information transmitted in one ATM cell can be increased as compared with the case of the prior art.

In the above explanation for the embodiment 3, we explain the case that address information addressing data stored in the commonly shared memory space is stored into the field of the virtual path identifier 22 and the virtual channel identifier 23, and the information stored in the commonly shared memory is stored into all of the 48 bytes in the information field in the ATM cell to be transmitted, but the present invention is not limited by this. For example, it can be acceptable that the information in the commonly shared memory space is stored in a part of the information field 24 in an ATM cell and an information length such as a byte length or byte size for the information stored in the part of the information field 24 is written into the other part in the information field 24. This case also causes the same effect of the embodiment 3 described above.

In addition, we will also explain the case that the virtual path identifier 22 and the virtual channel identifier 23 are included in the address information in the commonly shared memory space, but the present invention can also construct a ATM communication control system where a general cell is also transmitted with the ATM cell at the same time. Specifically, in this case, the values of a virtual path identifier 22 and a virtual channel identifier 23 corresponding to address information of data stored in the commonly shared memory space are limited in a predetermined range. When an ATM cell including the values of a virtual path identifier 22 and a virtual channel identifier 23 whose values are in the above range is received, the ATM cell is trapped into the internal section of the ATM communication device 1. On the other hand, when they are not in the above range, the received ATM cell is not trapped or is discarded because it is recognized by the ATM communication device that the received ATM cell is the general cell, not the ATM cell. In this case, the ATM communication device checks whether or not this received general cell must be trapped.

Embodiment 4.

In the embodiment 3, address information addressing data to be changed in the commonly shared memory space is stored into the field of all of or a part of the virtual path identifier and the virtual channel identifier in the ATM communication network system according. In this embodiment 4, the address information is also stored into a protocol data unit in an ATM adaptation layer which is a means for transmitting address information in the commonly shared memory space in the ATM communication network system in addition to the virtual path identifier field and the virtual channel identifier field. The configurations of the ATM communication device and the ATM cell in the ATM communication network system of the embodiment 4 are the same as those of the ATM communication network system of the embodiment 3.

Figure 9:
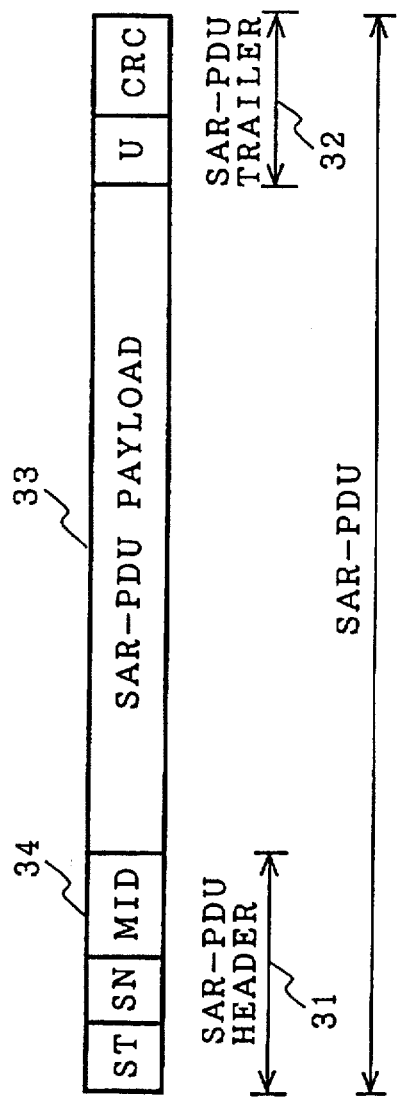
FIG. 9 is a diagram showing a configuration of a segmentation and reassemble sublayer protocol data unit in the ATM adaptation layer types 3/4 according to the embodiment 4 of the present invention.

FIG. 9 is a diagram showing a configuration of a segmentation and reassemble sublayer protocol data unit in ATM adaptation layer types 3/4 according to the embodiment 4 of the present invention. As shown in FIG. 9, the segmentation and reassemble sublayer protocol data unit comprises a segmentation and reassemble sublayer protocol data unit header 31, a segmentation and reassemble sublayer protocol data unit trailer 32, a segmentation and reassemble sublayer protocol data unit payload 33 and a multiplexing ID 34. Address information addressing information stored in the commonly shared memory space is stored in the multiplexing ID 34. The multiplexing ID 34 is used for identifying the use of a plurality of common part convergence sublayer protocol data units per one ATM layer connection.

Figure 10:
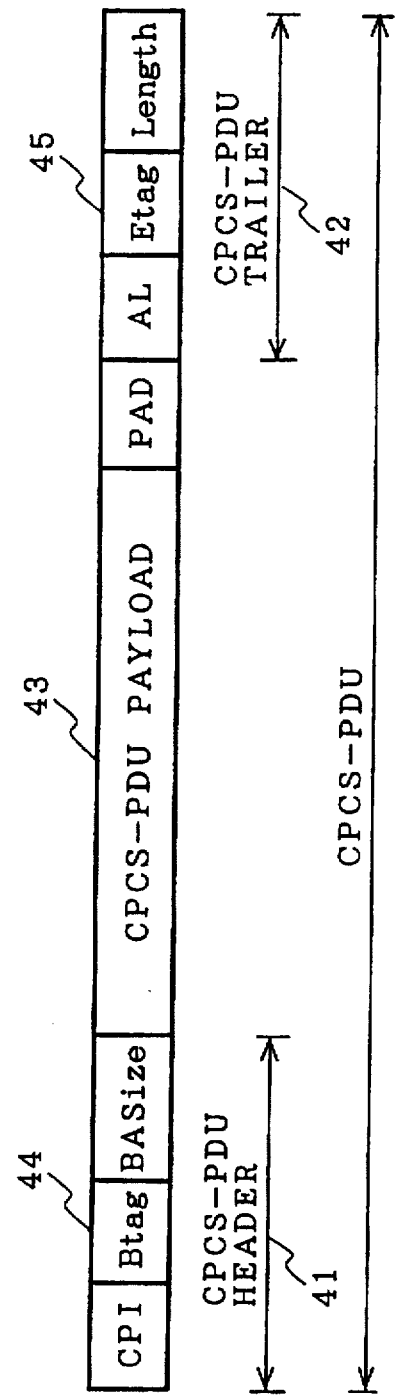
FIG. 10 is a diagram showing the configuration of a common part convergence sublayer protocol data unit in the ATM adaptation layer types 3/4.

FIG. 10 is a diagram showing the configuration of the common part convergence sublayer protocol data unit in the ATM adaptation layer types 3/4. The common part convergence sublayer protocol data unit comprises a common part convergence sublayer protocol data unit header 41, a common part convergence sublayer protocol data unit trailer 42, a common part convergence sublayer protocol data unit payload 43, a beginning tag 44 and an end tag 45. The beginning tag 44 stores address information in the commonly shared memory space, the end tag 45 also stores address information in the commonly shared memory space. The beginning tag 44 and the end tag 45 are used for comparing the common part convergence sublayer protocol data unit header 41 with the common part convergence sublayer protocol data unit trailer 42. Therefore a same value is stored into both of the beginning tag 44 and the end tag 45.

Figure 11:
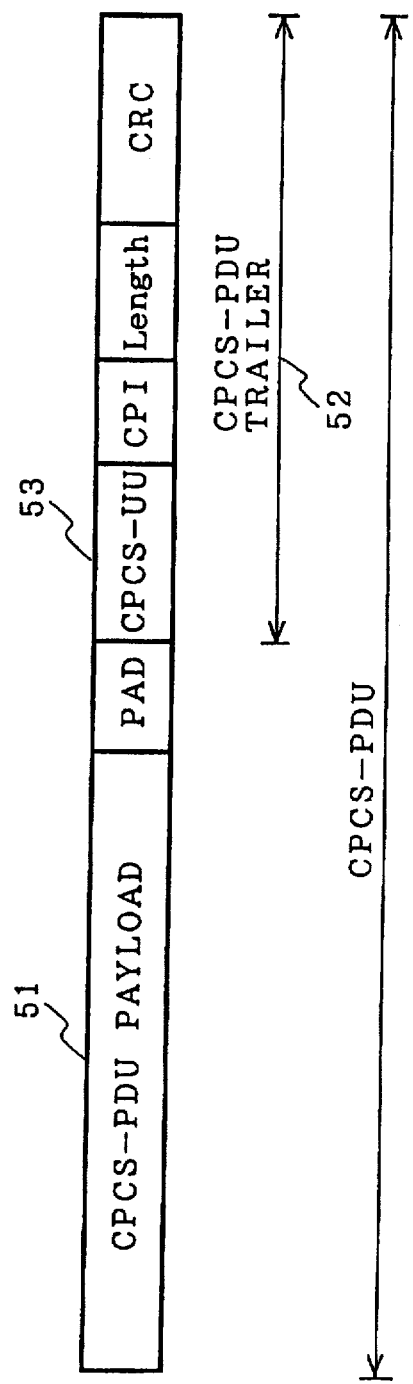
FIG. 11 is a diagram showing the configuration of a common part convergence sublayer protocol data unit in the ATM adaptation layer type 5.
Figure 12:
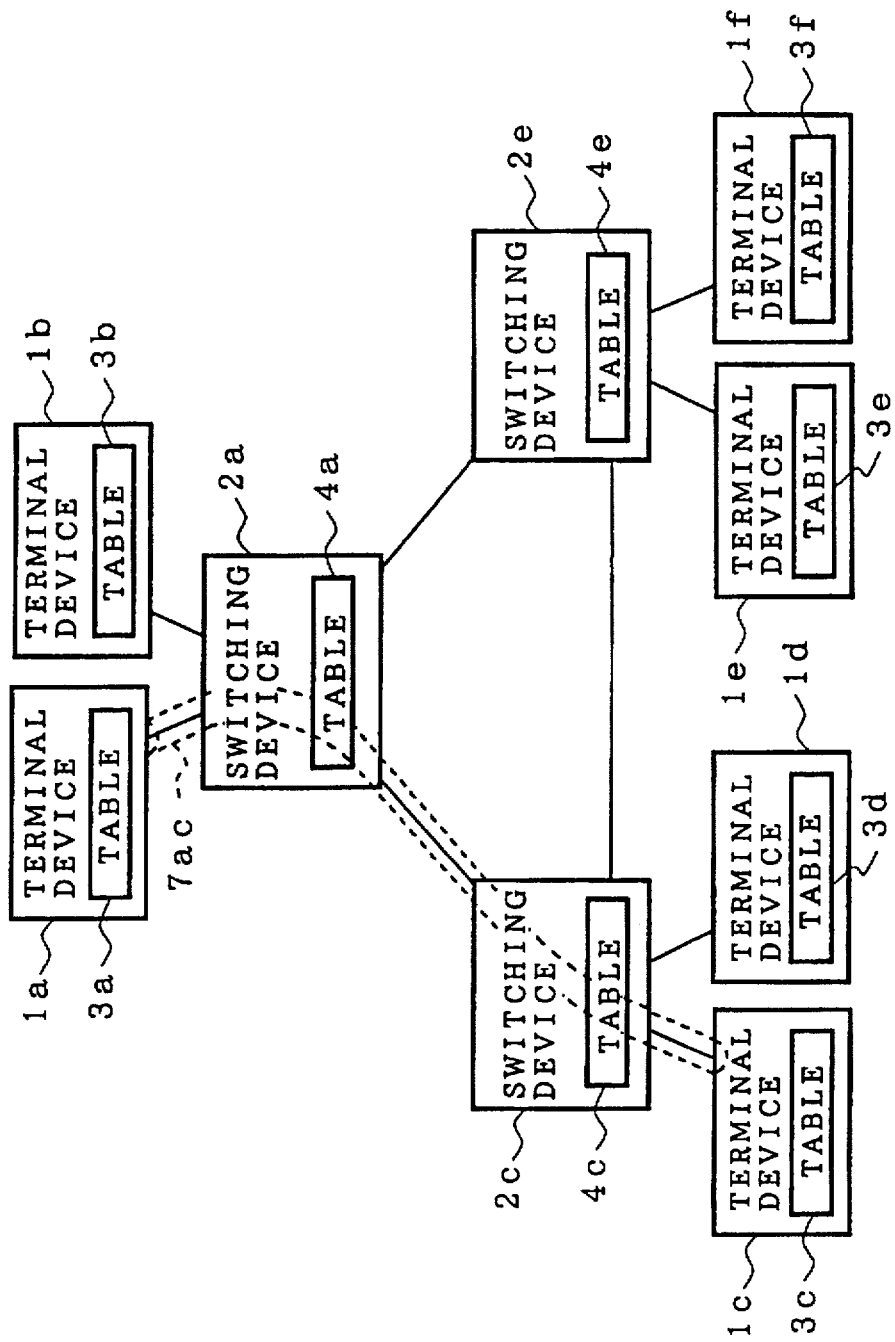
FIG. 12 is a block configuration diagram of a conventional ATM communication network system of a prior art.
Figure 13:
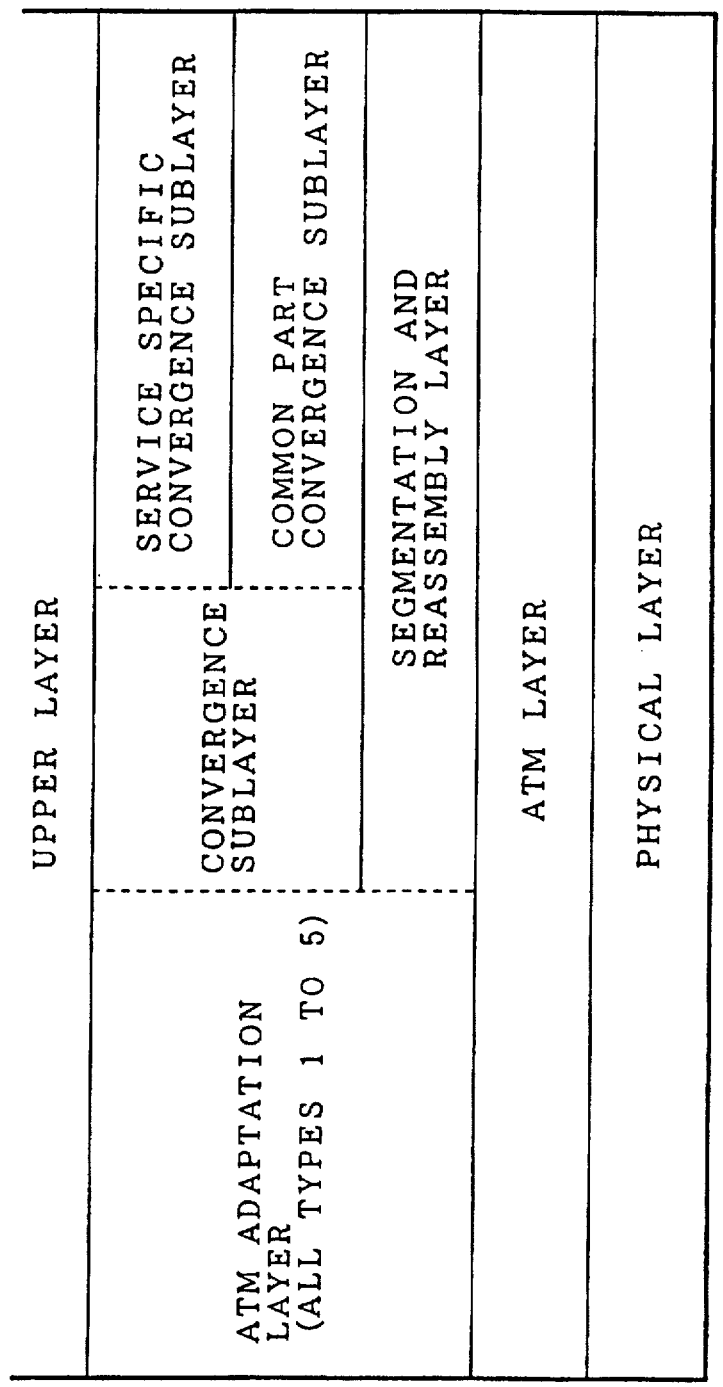
FIG. 13 is a diagram showing an ATM protocol configuration of a prior art.
Figure 15:
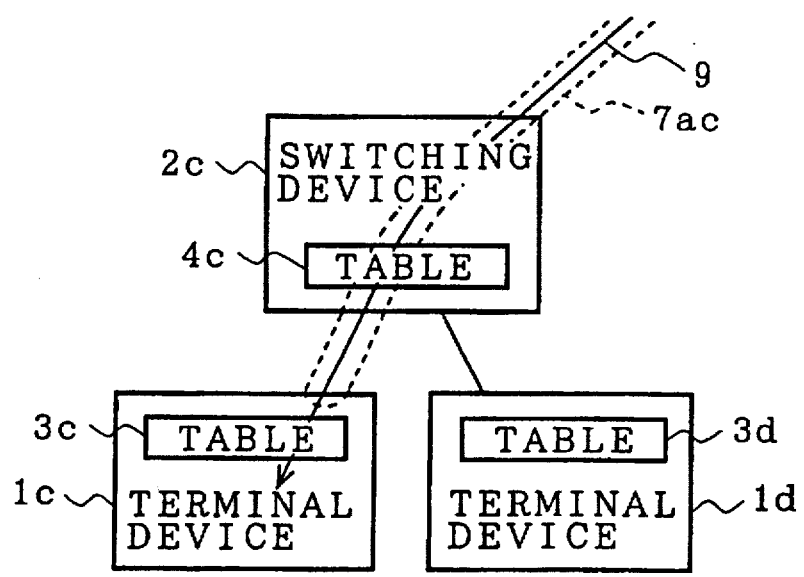
FIG. 15 is a block configuration diagram showing a part of an ATM communication network system for explaining the operation of the ATM switching device and the ATM terminal device according to a prior art.
Figure 16:
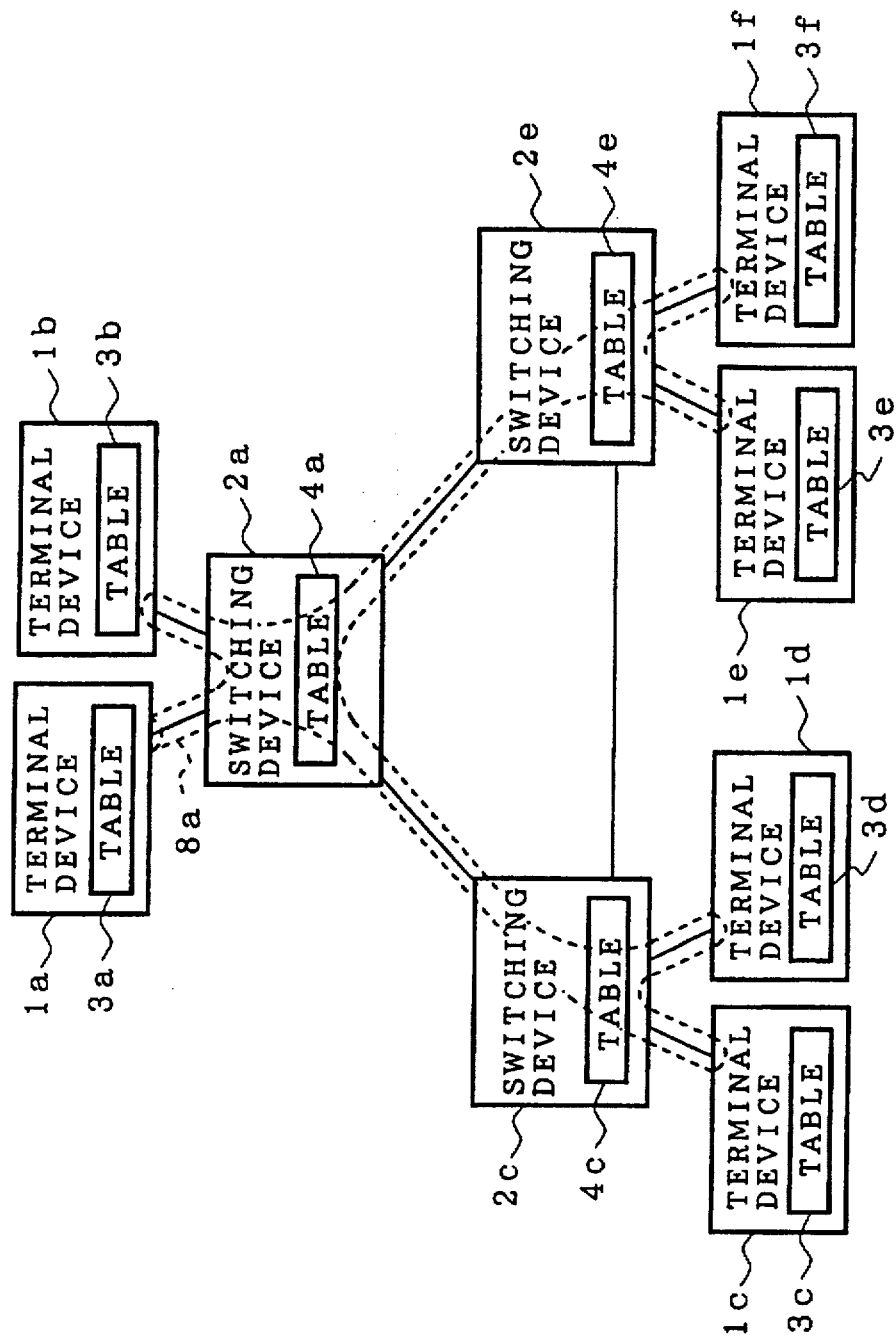
FIG. 16 is a block configuration diagram of an ATM communication network system of a prior art.
Figure 18:
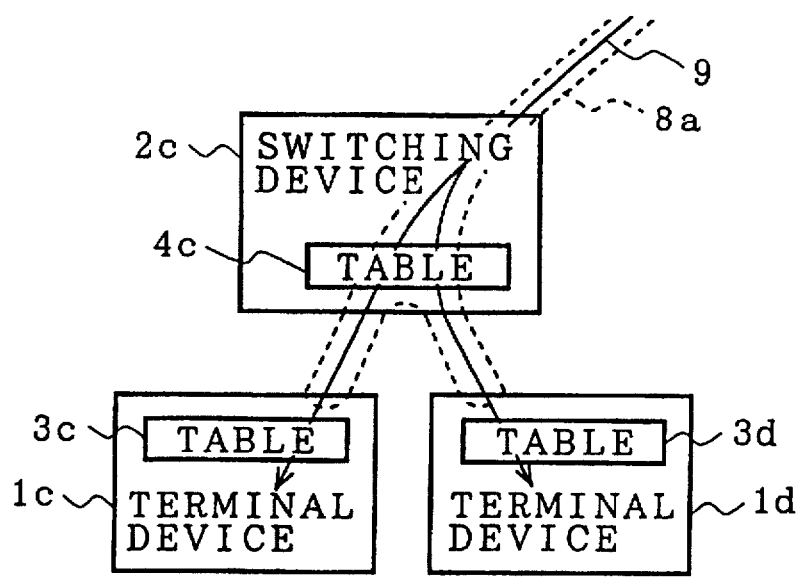
FIG. 18 is a block diagram showing a part of an ATM communication network system for explaining the operation of an ATM switching device and an ATM terminal device according to a prior art.
Figure 19:
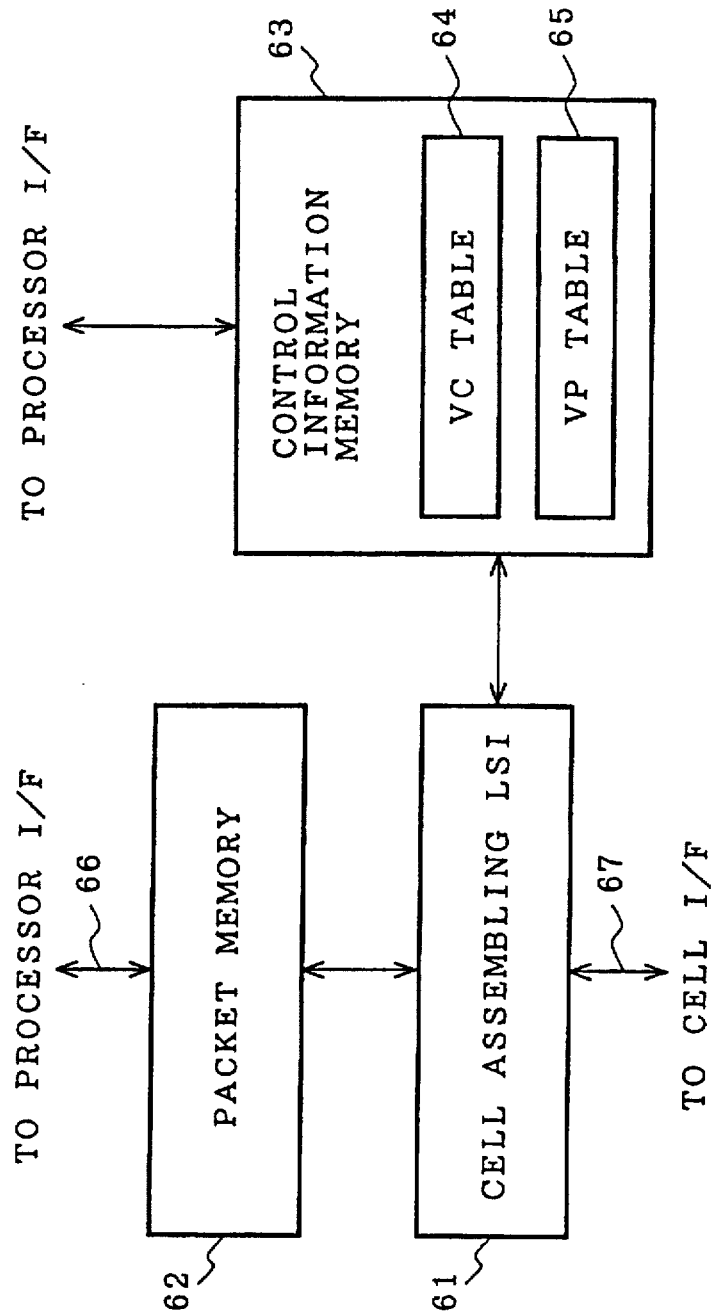
FIG. 19 is a configuration diagram showing a circuit system of a cell assembling LSI SARA-R of a prior art.

FIG. 11 is a diagram showing the configuration of a common part convergence sublayer protocol data unit in an ATM adaptation layer type 5. The common part convergence sublayer protocol data unit comprises a common part convergence sublayer protocol data unit payload 51, a common part convergence sublayer protocol data unit trailer 52, and a user-to-user indication display 53. The user-to-user indication display 53 is only used for passing through information between users in the common part convergence sublayer protocol data unit. In this embodiment 4, address information for the commonly shared memory space is stored in the user-to-user indication display 53.

Next, the operation of the ATM communication network system according to the embodiment 4 will be explained. We will explain the case that information in the commonly shared memory space is changed by using the ATM adaptation layer types 3/4 from the ATM terminal device 1a with reference to FIG. 20 which has been used in the explanation of the prior art.

When the ATM terminal device 1a changes the information in the commonly shared memory space, information to be changed and address information addressing the information to be changed in the commonly shared memory space are transmitted from the ATM terminal device 1a to the other ATM terminal devices 1b to 1f. This information to be changed is stored in the common part convergence sublayer protocol data unit payload 43 in the ATM adaptation layer types 3/4 as shown in FIG. 10, and the address information addressing the information to be changed in the commonly shared memory space is stored in all of or a part of the field of the multiplexing ID shown in FIG. 9 in addition to the virtual path identifier 22 and the virtual channel identifier 23 shown in FIG. 8.

In the present invention, it can also be acceptable to store the information to be changed in the commonly shared memory space into the common part convergence sublayer protocol data unit payload 43 in the ATM adaptation layer types 3/4 and the address information addressing the information to be changed in the commonly shared memory space into all of or a part of the beginning tag 44 and the end tag 45 shown in FIG. 8 in addition to the virtual path identifier 22 and the virtual channel identifier 23 shown in FIG. 8.

In addition, when the ATM terminal device 1a used in the prior art section as shown in FIG. 20 changes information in the commonly shared memory space by using the ATM adaptation layer type 5, information to be changed in the commonly shared memory space is stored into the common part convergence sublayer protocol data unit payload 51 in the ATM adaptation layer type 5. The address information addressing the information to be changed in the commonly shared memory space is stored into all of or a part of the user-to-user indication display 53 shown in FIG. 11 in addition to the virtual path identifier 22 and the virtual channel identifier 23 shown in FIG. 8.

As described above, in the ATM communication network system according to the embodiment 4, address information addressing data stored in the commonly shared memory space is stored into the field of the ATM layer protocol data unit in addition to the fields of the virtual path identifier 22 and the virtual channel identifier 23 even 1f the fields of the virtual path identifier and the virtual channel identifier are limited. Therefore, as compared with the case of the prior art, the information size or length of one ATM cell to be transmitted can be increased even 1f the field size of the virtual path identifier 22 and the virtual channel identifier 23 is limited within a length.

As described above in detail, the ATM communication device and the ATM communication network system have the following effects.

(1) In the ATM communication network system including the ATM communication devices of the present invention, because the virtual channel identifier which is uniquely assigned to each of the ATM communication devices in the point to multipoint network, the number of the entries in the connection control table in the ATM switching device in the ATM communication device can be reduced and the field size of the information in the connection control table used for the ATM switching device can also be decreased. Accordingly, the entire of the memory size in the ATM communication network system can also be decreased. In addition, in the ATM communication device, the judgement whether or not the received ATM cell is transmitted to its own ATM communication device can be performed by the ATM layer which is a lower class or layer than the ATM adaptation layer in the ATM communication device. Therefore the performance of the ATM communication device and the entire of the ATM communication network system can be increased.

(2) In the ATM communication network system using the ATM communication devices of the present invention, an ATM cell including change information and address information addressing the change information in the commonly shared memory space can be transmitted or broadcasted to each of other ATM communication devices at the same time without any conflicting on the point to multipoint connection of the virtual path. Accordingly, the ATM communication network system having a high efficiency can be constructed.

(3) In the ATM communication network system of the present invention, because address information is not stored in the information field 24 in an ATM cell, the size of the information to be transmitted by one ATM cell can be increased. Accordingly, the entire of the network traffic of the ATM communication network system can be reduced.

What is claimed is:

1. An asynchronous transfer mode (ATM) terminal communication device for forming, in combination with a plurality of other ATM terminal communication devices, an ATM communication network system, the ATM terminal communication device comprising:

memory means including a connection control table having, for each ATM terminal communication device forming the ATM communication network system, an assigned virtual path identifier and an assigned virtual channel identifier;

an ATM cell transmission section for transmitting an output ATM cell including the virtual path identifier assigned to the ATM terminal communication device and the virtual channel identifier assigned to at least one of the plurality of other ATM terminal communication devices, the virtual path identifier indicating the ATM terminal communication device as a transmitter of the output ATM cell, and the virtual channel identifier indicating the at least one of the plurality of other ATM terminal communication devices as a receiver of the output ATM cell; and an ATM cell receiving section for comparing a virtual channel identifier of an input ATM cell with the virtual channel identifier assigned to the ATM terminal communication device, trapping the input ATM cell when the virtual channel identifier of the input ATM cell matches the virtual channel identifier of the ATM terminal communication device, and discarding the input ATM cell when the virtual channel identifier of the input ATM cell does not match the virtual channel identifier of the ATM terminal communication device.

2. The ATM terminal communication device of claim 1, further comprising:

second memory means for storing a copy of contents stored in a commonly shared memory space that is commonly used among the ATM terminal communication device and the plurality of other ATM terminal communication devices.

3. An asynchronous transfer mode (ATM) communication network system constructed by connecting a plurality of ATM terminal communication devices to each other through connections, each of the plurality of ATM terminal communication devices having a transmission function to transmit an output ATM cell and a receiving function to receive an input ATM cell, wherein each of the plurality of ATM terminal communication devices comprises:

memory means including a connection control table having, for each ATM terminal communication device, an assigned virtual path identifier and an assigned virtual channel identifier;

an ATM cell transmission section for transmitting an output ATM cell including the virtual path identifier assigned to the ATM terminal communication device and the virtual channel identifier assigned to other ATM terminal communication devices, the virtual path identifier indicating the ATM terminal communication device as a transmitter of the output ATM cell, and the virtual channel identifier indicating at least one of the other ATM terminal communication devices as a receiver of the output ATM cell; and an ATM cell receiving section for comparing a virtual channel identifier of an input ATM cell with the virtual channel identifier assigned to the ATM terminal communication device, trapping the input ATM cell when the virtual channel identifier of the input ATM cell matches the virtual channel identifier of the ATM terminal communication device, and discarding the input ATM cell when the virtual channel identifier of the input ATM cell does not match the virtual channel identifier of the ATM terminal communication device, wherein the plurality of ATM terminal communication devices form a point to multipoint connection for a virtual path identified by the virtual path identifier of the output ATM cell transmitted from the ATM terminal communication device.

4. The ATM communication network system of claim 3, wherein the connection control table of each ATM terminal communication device further includes a virtual channel identifier designating all of the plurality of ATM terminal communication devices; wherein an ATM cell transmission section of a first ATM terminal communication device adds the virtual channel identifier designating all of the plurality of ATM terminal communication devices into a first ATM cell and transmits the first ATM cell to each of the plurality of ATM terminal communication devices; and wherein the ATM cell receiving section of a second ATM terminal communication device receives the first ATM cell and compares the virtual channel identifier in the first ATM cell with the virtual channel identifier designating all of the plurality of ATM terminal communication devices, recognizes that all of the ATM terminal communication devices are designated, and traps the first ATM cell.

5. The ATM communication network system of claim 3, wherein each of the plurality of ATM terminal communication devices further comprises second memory means for storing a copy of contents stored in a commonly shared memory space that is commonly used among the plurality of ATM terminal communication devices; wherein the ATM cell transmission section of a first ATM terminal communication device stores change information to be changed in the commonly shared memory space in an information field of a first ATM cell and address information designating an address of the change information in the commonly shared memory space in at least part of a field to store a virtual path identifier and a virtual channel identifier and then transmits the first ATM cell to other ATM terminal communication devices; and wherein the ATM cell receiving section of a second ATM terminal communication device reads the address information stored in the field of the virtual path identifier and the virtual channel identifier in the first ATM cell, and changes the information in the second memory means in the second ATM terminal communication device based on the change information stored in the information field of the first ATM cell.

6. The ATM communication network system of claim 5, wherein the address information addressing the change information in the commonly shared memory space to be changed and transmitted from the ATM cell transmission section of the first ATM terminal communication device to the other ATM terminal communication devices is stored into a segmentation and reassemble sublayer protocol data unit for an ATM adaptation layer type 3 or 4 in addition to the field of the virtual path identifier and the virtual channel identifier in the first ATM cell.

7. The ATM communication network system of claim 6, wherein the segmentation and reassemble sublayer protocol data unit comprises a segmentation and reassemble sublayer protocol data unit header field, a segmentation and reassemble sublayer protocol data unit trailer field, a segmentation and reassemble sublayer protocol data unit payload field and a multiplexing ID field, wherein the address information is stored into the multiplexing ID field in addition to the field of the virtual path identifier and the virtual channel identifier, and wherein the change information is stored in the segmentation and reassemble sublayer protocol data unit payload field.

8. The ATM communication network system of claim 5, wherein the address information addressing the change information in the commonly shared memory space to be changed and transmitted from the ATM cell transmission section of the first ATM terminal communication device to the other ATM terminal communication devices is stored into a common part convergence sublayer protocol data unit for an ATM adaptation layer type 3 or 4 in addition to the field of the virtual path identifier and the virtual channel identifier in the first ATM cell.

9. The ATM communication network system of claim 8, wherein the common part convergence sublayer protocol data unit comprises a common part convergence sublayer protocol data unit header field, a common part convergence sublayer protocol data unit trailer field, a common part convergence sublayer protocol data unit payload field, a beginning tag field and a an end tag field, wherein the address information is stored into the beginning tag field or the end tag field in addition to the field of the virtual path identifier and the virtual channel identifier, and wherein the change information is store in the common part convergence sublayer protocol data unit payload field.

10. The ATM communication network system of claim 5, wherein the address information addressing the change information in the commonly shared memory space to be changed and transmitted from the ATM cell transmission section to the other ATM terminal communication devices is stored into a common part convergence sublayer protocol data unit for an ATM adaptation layer type 5 in addition to the field of the virtual path identifier and the virtual channel identifier in the first ATM cell.

11. The ATM communication network system of claim 10, wherein the common part convergence sublayer protocol data unit comprises a common part convergence sublayer protocol data unit payload field, a common part convergence sublayer protocol data unit trailer field and a user-to-user indication field, wherein the address information is stored into the user-to-user indication field in addition to the field of the virtual path identifier and the virtual channel identifier, and wherein the change information is store in the common part convergence sublayer protocol data unit payload field.

* * * * *